(12) United States Patent
Hunter et al.

(10) Patent No.: US 7,653,449 B2
(45) Date of Patent: Jan. 26, 2010

(54) RESOURCE ALLOCATION TECHNIQUE

(75) Inventors: Brian A. Hunter, Boston, MA (US);
Ashish Kulkarni, Cambridge, MA (US);
Soulaymane Kachani, New York, NY (US)

(73) Assignee: Strategic Capital Network, LLC, Boston, MA (US)

( * ) Notice: Subject to any disclaimer, the term of this patent is extended or adjusted under 35 U.S.C. 154(b) by 318 days.

(21) Appl. No.: 10/561,095

(22) PCT Filed: Jun. 18, 2004

(86) PCT No.: PCT/US2004/019860

§ 371 (c)(1), (2), (4) Date: Dec. 16, 2005

(87) PCT Pub. No.: WO2004/114095

PCT Pub. Date: Dec. 29, 2004

(65) Prior Publication Data

US 2006/0200400 A1    Sep. 7, 2006

Related U.S. Application Data

(60) Provisional application No. 60/480,097, filed on Jun. 20, 2003.

(51) Int. Cl.
*G06Q 40/00* (2006.01)
*G05B 19/418* (2006.01)
*G06F 17/18* (2006.01)
*G06F 9/50* (2006.01)

(52) U.S. Cl. .......................... 700/99; 705/8; 705/36 R; 702/181

(58) Field of Classification Search .................. 700/97, 700/28, 51, 99–102; 705/36, 7, 8–11, 35, 705/36 R, 36 T, 38; 702/179–181
See application file for complete search history.

(56) References Cited

U.S. PATENT DOCUMENTS

| | | | | |
|---|---|---|---|---|
| 5,884,287 A | * | 3/1999 | Edesess | 705/36 R |
| 5,918,217 A | * | 6/1999 | Maggioncalda et al. | 705/36 R |
| 5,930,762 A | * | 7/1999 | Masch | 705/7 |
| 6,021,397 A | * | 2/2000 | Jones et al. | 705/36 R |
| 6,085,216 A | * | 7/2000 | Huberman et al. | 718/104 |
| 6,405,179 B1 | * | 6/2002 | Rebane | 705/36 R |
| 7,236,953 B1 | * | 6/2007 | Cooper et al. | 705/36 R |
| 7,315,842 B1 | * | 1/2008 | Wang | 705/38 |
| 7,349,878 B1 | * | 3/2008 | Makivic | 705/37 |
| 7,376,610 B2 | * | 5/2008 | Schneider | 705/36 R |
| 2002/0022988 A1 | * | 2/2002 | Columbus et al. | 705/11 |
| 2002/0038271 A1 | * | 3/2002 | Friend et al. | 705/36 |
| 2002/0091605 A1 | * | 7/2002 | Labe et al. | 705/36 |
| 2002/0123953 A1 | * | 9/2002 | Goldfarb et al. | 705/36 |
| 2002/0143682 A1 | * | 10/2002 | Bergmann et al. | 705/36 |
| 2002/0174042 A1 | * | 11/2002 | Arena et al. | 705/35 |
| 2003/0018762 A1 | * | 1/2003 | Mullen | 709/223 |

(Continued)

*Primary Examiner*—M. N. Von Buhr
(74) *Attorney, Agent, or Firm*—Gordon E. Nelson

(57) ABSTRACT

An improved resource allocation system comprising a reliability decision engine (323), which allocates the portfolio's assets as required for the desired reliability portfolio. The reliability decision engine including two reliability decision engines, a basic reliability decision engine (325) and a robust reliability decision engine (327). The use of robust optimization makes it possible to determine the sensitivity of the optimized portfolio. Scenarios can be specified directly by the user or automatically generated by the system in response to a selection by the user. Inputs (329, 331) are applied to basic the basic reliability decision engine (325) and inputs (311) are applied to robust reliability decision engine (327).

35 Claims, 13 Drawing Sheets

U.S. PATENT DOCUMENTS

| | | | |
|---|---|---|---|
| 2003/0028466 A1* | 2/2003 | Jenson et al. | 705/36 |
| 2003/0046212 A1 | 3/2003 | Hunter et al. | |
| 2003/0055765 A1* | 3/2003 | Bernhardt | 705/36 |
| 2004/0138897 A1* | 7/2004 | Eapen | 705/1 |
| 2005/0004856 A1* | 1/2005 | Brose et al. | 705/35 |
| 2005/0010510 A1* | 1/2005 | Brose et al. | 705/35 |
| 2008/0082383 A1* | 4/2008 | Hollas | 705/7 |
| 2008/0270322 A1* | 10/2008 | Cooper et al. | 705/36 R |

* cited by examiner

RESOURCE ALLOCATION TECHNIQUE

THE CROSS REFERENCES TO RELATED APPLICATIONS

This application claims priority from U.S. provisional patent application 60/480,097. Hunter. et al., Reliability decision engine, filed 20 Jun. 2003, and discloses further developments of techniques which are the subject matter of PCT/US01/00636, Hunter. et al., Resource allocation techniques. filed 9 Jan. 2001 and claiming priority from U.S. provisional application 60/175,261. Hunter. et al., having the same title and filed 10 Jan. 2000. The U.S. National Phase of PCT/US01/00636 is U.S. Ser. No. 10/018,696, filed 13 Dec. 2001, which is hereby incorporated by reference into the present patent application for all purposes. The present patent application contains the entire Background of the invention from U.S. Ser. No. 10/018,696 and the Detailed Description through the section titled Computation of the real option value of the portfolio.

BACKGROUND OF THE INVENTION

1. Field of the Invention

The invention concerns techniques for allocating a resource among a number of potential uses for the resource such that a satisfactory tradeoff between a risk and a return on the resource is obtained. More particularly, the invention concerns improved techniques for determining the risk-return tradeoff for particular uses, techniques for determining the contribution of uncertainty to the value of the resource, techniques for specifying risks, and techniques for quantifying the effects and contribution of diversification of risks on the risk-return tradeoff and valuation for a given allocation of the resource among the uses.

2. Description of Related Art

People are constantly allocating resources among a number of potential uses. At one end of the spectrum of resource allocation is the gardener who is figuring out how to spend his or her two hours of gardening time this weekend; at the other end is the money manager who is figuring out how to allocate the money that has been entrusted to him or her among a number of classes of assets. An important element in resource allocation decisions is the tradeoff between return and risk. Generally, the higher the return the greater the risk, but the ratio between return and risk is different for each of the potential uses. Moreover, the form taken by the risk may be different for each of the potential uses. When this is the case, risk may be reduced by diversifying the resource allocation among the uses.

Resource allocation thus typically involves three steps:
1. Selecting a set of uses with different kinds of risks;
2. determining for each of the uses the risk/return tradeoff; and
3. allocating the resource among the uses so as to maximize the return while minimizing the overall risk.

As is evident from proverbs like "Don't put all of your eggs in one basket" and "Don't count your chickens before they're hatched", people have long been using the kind of analysis summarized in the above three steps to decide how to allocate resources. What is relatively new is the use of mathematical models in analyzing the risk/return tradeoff. One of the earliest models for analyzing risk/return is net present value; in the last ten years, people have begun using the real option model; both of these models are described in Timothy A. Luehrman, "Investment Opportunities as Real Options: Getting Started on the Numbers", in: *Harvard Business Review*, July-August 1998, pp. 3-15. The seminal work on modeling portfolio selection is that of Harry M. Markowitz, described in Harry M. Markowitz, *Efficient Diversification of Investments*, second edition, Blackwell Pub, 1991.

The advantage of the real option model is that it takes better account of uncertainty. Both the NPV model and Markowitz's portfolio modeling techniques treat return volatility as a one-dimensional risk. However, because things are uncertain, the risk and return for an action to be taken at a future time is constantly changing. This fact in turn gives value to the right to take or refrain from taking the action at a future time. Such rights are termed options. Options have long been bought and sold in the financial markets. The reason options have value is that they reduce risk: the closer one comes to the future time, the more is known about the action's potential risks and returns. Thus, in the real option model, the potential value of a resource allocation is not simply what the allocation itself brings, but additionally, the value of being able to undertake future courses of action based on the present resource allocation. For example, when a company purchases a patent license in order to enter a new line of business, the value of the license is not just what the license could be sold to a third party for, but the value to the company of the option of being able to enter the new line of business. Even if the company never enters the new line of business, the option is valuable because the option gives the company choices it otherwise would not have had. For further discussions of real options and their uses, see Keith J. Leslie and Max P. Michaels, "The real power of real options", in: *The McKinsey Quarterly*, 1997, No. 3, pp. 4-22, and Thomas E. Copland and Philip T. Keenan, "Making real options real", *The McKinsey Quarterly*, 1998, No. 3, pp. 128-141.

In spite of the progress in applying mathematics to the problem of allocating a resource among a number of different uses, difficulties remain. First, the real option model has heretofore been used only to analyze individual resource allocations, and has not been used in portfolio selection. Second, there has been no good way of quantifying the effects of diversification on the overall risk.

Experience with the resource allocation system of U.S. Ser. No. 10/018,696 has demonstrated the usefulness of the system, but has also shown that it is unnecessarily limited. It is an object of the invention disclosed herein to overcome the limitations of U.S. Ser. No. 10/018,696 and thereby to provide an improved resource allocation system.

SUMMARY OF THE INVENTION

The object of the invention is attained in one aspect by a technique for determining the reliability of the returns from a user-selected set of assets. The new technique determines the mean time to failure (MTTF) reliability of the set of assets, that is, the probability that one or more assets belonging to the set will fail to provide the desired minimum return indicated for the assets.

The object of the invention is attained in another aspect by a robust optimization technique in which the optimization is done over a set of user-selected or defined scenarios. In a scenario, values which are used in the optimization are defined to vary stochastically across a range and a probability is associated with the scenario. The scenarios can thus be set up to represent extreme conditions such as those seen in crises and the optimization optimizes the worst-case value of the set of assets over the set of scenarios. Examples of the kinds of scenarios include scenarios which correspond to the historical returns data for the assets in the set, scenarios in which certain assets become highly correlated, and scenarios based on outliers in the historical returns data.

The object of the invention is attained in a third aspect by a method of optimization which first uses MTTF reliability to select the assets in the portfolio and then optimizes the portfolio. Optimization may be done using the techniques of U.S. Ser. No. 10/018,696 or robust optimization techniques. In the optimization, the user may specify optimization subject to a plurality of constraints that specify a probability that the set of assets yield a desired minimum return. Further, optimizations may be done on portfolios in which assets have negative weights or in which the combined weights are more than 1, thereby permitting optimization of portfolios that involve shorted assets or leveraged assets. Constraints are also possible which restrict the sum of the weights of a subset of the assets and which limit the portfolio's downside risks. The method of optimization further permits selection among a number of objective functions and adjusting the objective function by assigning a premium or discount to the real value of one or more of the assets. Also permitted in the method is selection among a number of modes of quantifying risk.

Other objects and advantages will be apparent to those skilled in the arts to which the invention pertains upon perusal of the following Detailed Description and drawing, wherein:

BRIEF DESCRIPTION OF THE DRAWING

FIG. 10 shows the graphical user interface for selecting an objective function;

FIG. 13 shows the contents of assets and parameters tab 421.

Figure 1:
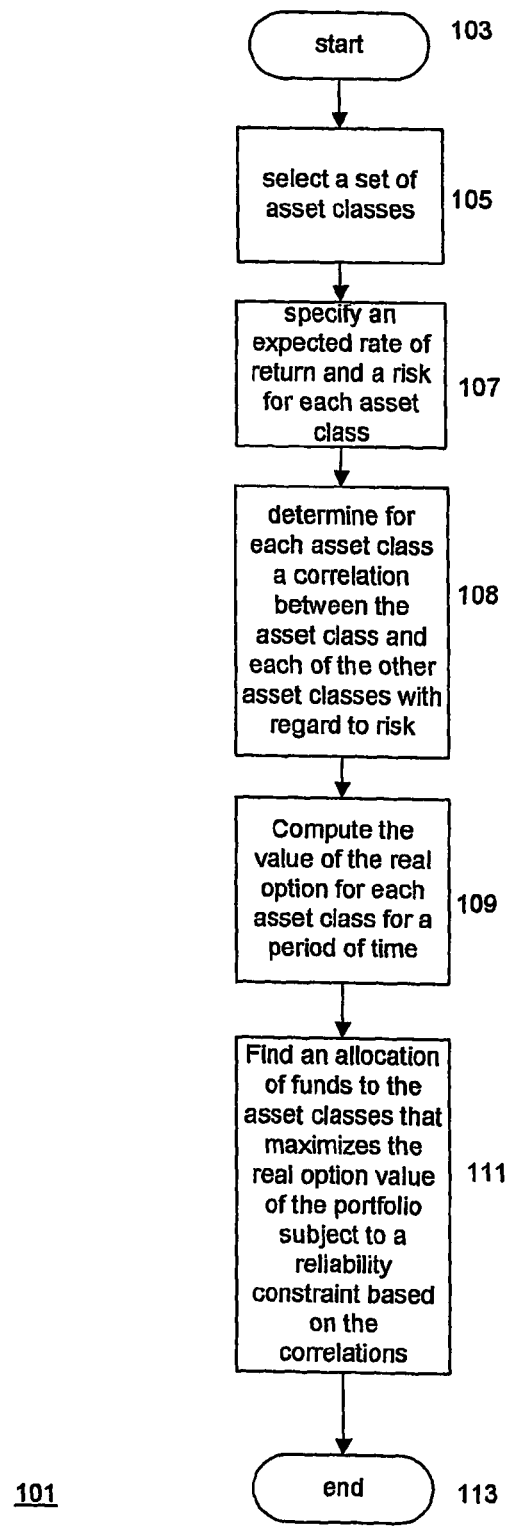
FIG. 1 is a flowchart of resource allocation according to the resource allocation system described in U.S. Ser. No. 10/018, 696.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin by describing how techniques originally developed to quantify the reliability of mechanical, electrical, or electronic systems can be used to quantify the effects of diversification on risk and will then describe a resource allocation system which uses real option analysis and reliability analysis to find an allocation of the resource among a set of uses that attains a given return with a given reliability. Thereupon will be described improvements to the resource allocation system including the following:

The use of MTTF reliability to select a portfolio of assets to be optimized using real option analysis;

The use of robust optimization in the resource allocation system;

The use of multiple constraints in optimization;

The use of various kinds of constraints in the optimization; and

Modifications of the objective function used in the optimization.

The objective function is the function used to calculate the real option values of the assets; in the original resource allocation system, the only available objective function was the Black-Scholes formula using the standard deviation of the portfolio to express the portfolio's volatility. The descriptions of the improvements will include descriptions of the graphical user interfaces for the improvements. Also included will be a description of an implementation of a preferred embodiment of the improved system.

Applying Reliability Techniques to Resource Allocation

Reliability is an important concern for the designers of mechanical, electrical, and electronic systems. Informally, a system is reliable if it is very likely that it will work correctly. Engineers have measured reliability in terms of the probability of failure; the lower the probability of failure, the more reliable the system. The probability of failure of a system is determined by analyzing the probability that components of the system will fail in such a way as to cause the system to fail. A system's reliability can be increased by providing redundant components. An example of the latter technique is the use of triple computers in the space shuttle. All of the computations are performed by each of the computers, with the computers voting to decide which result is correct. If one of the computers repeatedly provides incorrect results, it is shut down by the other two. With such an arrangement, the failure of a single computer does not disable the space shuttle, and even the failure of two computers is not fatal. The simultaneous or near simultaneous failure of all three computers is of course highly improbable, and consequently, the space shuttle's computer system is highly reliable. Part of providing redundant components is making sure that a single failure elsewhere will not cause all of the redundant components to fail simultaneously; thus, each of the three computers has an independent source of electrical power. In mathematical terms, if the possible causes of failure of the three computers are independent of each other and each of the computers has a probability of failure of n during a period of time T, the probability that all three will fail in T is $n^3$.

The aspect of resource allocation that performs the same function as redundancy in physical systems is diversification. Part of intelligent allocation of a resource among a number of uses is making sure that the returns for the uses are subject to different risks. To give an agricultural example, if the resource is land, the desired return is a minimum amount of corn for livestock feed, some parts of the land are bottom land that is subject to flooding in wet years, and other parts of the land are upland that is subject to drought in dry years, the wise farmer will allocate enough of both the bottom land and the upland to corn so that either by itself will yield the minimum amount of corn. In either a wet or dry year, there will be the minimum amount of corn, and in a normal year there will be a surplus.

Reliability analysis can be applied to resource allocation in a manner that is analogous to its application to physical systems. The bottom land and the upland are redundant systems in the sense that either is capable by itself of yielding the minimum amount in the wet and dry years respectively, and consequently, the reliability of receiving the minimum amount is very high. In mathematical terms, a given year cannot be both wet and dry, and consequently, there is a low correlation between the risk that the bottom land planting will fail and the risk that the upland planting will fail. As can be seen from the example, the less correlation there is between the risks of the various uses for a given return, the more reliable the return is.

A System that Uses Real Options and Reliability to Allocate Investment Funds: FIG. 1

In the resource allocation system of the preferred embodiment, the resource is investment funds, the uses for the funds are investments in various classes of assets, potential valuations of the asset classes resulting from particular allocations of funds are calculated using real options, and the correlations between the risks of the classes of assets are used to determine the reliability of the return for a particular allocation of funds to the asset classes. FIG. 1 is a flowchart 101 of the processing done by the system of the preferred embodiment. Processing begins at 103. Next, a set of asset classes is selected (105), Then an expected rate of return and a risk is specified for each asset class (107). The source for the expected rate of return for a class and the risk may be based on historical data. In the case of the risk, the historical data may be volatility data. In other embodiments, the expected rate of return may be based on other information and the risk may be any quantifiable uncertainty or combination thereof, including economic risks generally, business risks, political risks or currency exchange rate risks.

Next, for each asset class, correlations are determined between the risk for the asset class and for every other one of the asset classes (108). These correlations form a correlation matrix. The purpose of this step is to quantify the diversification of the portfolio. Thereupon, the present value of a real option for the asset class for a predetermined time is computed (109). Finally, an allocation of the funds is found which maximizes the present values of the real options (111), subject to a reliability constraint which is based on the correlations determined at 108.

Mathematical Details of the Reliability Computation

In a preferred embodiment, the reliability of a certain average return on the portfolio is found from the average rate of return of the portfolio over a period of time T and the standard deviation a for the portfolio's return over the period of time T. The standard deviation for the portfolio represents the volatility of the portfolio's assets over the time T. The standard deviation for the portfolio can be found from the standard deviation of each asset over time T and the correlation coefficient ρ for each pair of asset classes. For each pair A,B of asset classes, the standard deviations for the members of the pair and the correlation coefficient are used to compute the covariance for the pair over the time T, with cov $(A,B)_T = \rho_{A,B} \sigma_{A,T} \sigma_{B,T}$. Continuing in more detail, for a general portfolio with a set S of at least two or more classes of assets, the portfolio standard deviation and the portfolio's rate of return can be written as:

$$\sigma_{P,T}^2 = \sum_{A \in S} \sum_{\substack{B \in S \\ B \neq A}} x_a x_b \rho_{AB} \sigma_{A,T} \sigma_{B,T} + \sum_{A \in S} x_A^2 \sigma_{A,T}^2$$

$$r_{P,T} = \sum_{A \in S} x_A r_{A,T}$$

Where:
$\sigma_{P,T}$ is the standard deviation (or volatility) of the portfolio over T periods of time;
$r_{P,t}$ is the average rate of return of the portfolio over T periods of time;
$x_A$ is the fraction of portfolio invested in asset class A;
$\rho_{A,B}$ is the correlation of risk for the pair of asset classes A and B;
$\sigma_{A,T}$ is the standard deviation of asset class A over T periods of time;
$r_{A,T}$ is the average rate of return of asset class A over T periods of time; and
S is the set of asset classes.

We assume in the following that the portfolio P follows a normal distribution with mean of $r_{P,T}$ and with standard deviation of $\sigma_{P,T}$: $N(r_{P,T}, \sigma_{P,T})$.

The reliability constraint α will thus be:

$$Pr(x \geq r_{min}) \geq \alpha \Leftrightarrow 1 - \Phi((r_{min} - r_{P,T})/\sigma_{P,T}) \geq \alpha$$

where $r_{P,T}$ and $\sigma_{P,T}$ are replaced by their respective values from the equation above. The constraint can be estimated using the expression $$\left( r_{min} - \sum_{A \in S} x_A r_{A,T_A} \right)^2 \leq \delta^2 \sum_{A \in S} \sum_{B \in S} x_A x_B \sigma_{AB}$$

where $\delta^2$ is obtained from a using Simpson's rule. Details of the computation of δ will be provided later.

Computation of the Real Option Value of the Portfolio

The above reliability constraint is applied to allocations of resources to the portfolio which maximize the real option value of the portfolio over the time period T. The real option value of portfolio is arrived at using the Black-Scholes formula. In the formula, $T_A$ is the time to maturity for an asset class A and $x_{Ai}$ is the fraction of the portfolio invested in asset class A during the period of time i, where $T_A$ is divided into equal periods 0 ... $T_A$-1.

To price a real option for an asset class A over a time T according to the Black-Scholes formula, one needs the following values:
A, the current value of asset class A;
T, time to maturity from time period 0 to maturity;
Ex, value of the next investment;
$r_f$, risk-free rate of interest;
σ, volatility $$A = x_{A0} P$$

$$Ex = x_{A0} P (1 + r_{min,A})^{T_A}$$

For a period i, the value $V_{A,i}$ of the real option corresponding to the choice of asset class A at time i using the Black-Scholes formula is:

$$V_{A,i} = \Phi\left( \frac{\log\left(\frac{1}{(1+r_{min,A})^{T_A-i}}\right) + (r_f + 0.5\sigma^2)(T_A - i)}{\sigma\sqrt{T_A - i}} \right) x_{A,i} P - $$

$$\Phi\left( \frac{\log\left(\frac{1}{(1+r_{min,A})^{T_A-i}}\right) + (r_f + 0.5\sigma^2)(T_A - i)}{\sigma\sqrt{T_A - i}} - \sigma\sqrt{T_A - i} \right)$$

$$x_{A,i} P (1 + r_{min,T_A})^{T_A - i} \exp(-r_f(T_A - i))$$

The above formula is an adaptation of the standard Black-Scholes formula. It differs in two respects: first, it does not assume risk-neutral valuation; second an exponential term has been added to the first term of $V_{A,i}$ and corresponds to the discounted value for a rate of return $r_a$. With these two changes, the real option value is better suited to the context of asset allocation.

The allocation of the available funds to the asset classes that maximizes the real option value of the portfolio can be found with the optimization program $$\underset{\substack{x_{A,i} \\ A \in S}}{\text{Max}} \sum_{A \in S} \frac{1}{T_A - i} \left( \frac{V_{A,i}}{x_{A,i}} - V_{min,A} \right) x_{A,i}$$

the program being subject to reliability constraints such as the one set forth above.

Overview of the Improved Resource Allocation System

The following overview of an improved version of the resource allocation system described above begins with an overview of its operation, continues with an overview of flows of information within the system, and concludes with an overview of the user interface for the system. The improved resource allocation system uses two measures for the reliability of a portfolio of assets. The first of these is a measure of "mean time to failure" (MTTF) reliability; the second is a measure of total return reliability. In the improved system, MTTF reliability is used to determine the reliability of sets of assets. A portfolio consisting of a set of assets that has sufficient MTTF reliability is then optimized using constraints that may include a constraint based on the total return reliability measure.

In allocating assets, the user can take into account realistic real-world constraints based on investor risk preferences, shorting, leverage, asset class constraints, minimum investment thresholds, and downside constraints and devise optimal portfolios that maximize upside potential while accounting for liquidity, reliability of data, and premiums or discounts associated with non-normal behavior of data. Instead of the single objective function and volatility measure used in the original system, the improved system permits the user to choose among a number of objective functions and volatility measures.

The improved asset allocation system further incorporates robust optimization, i.e., optimization which recognizes inherent uncertainty in data and stochastic variations in parameter estimates to come up with a robust, reliable portfolio based on a set of comprehensive scenarios spanning the realm of possibilities for the assets in the portfolio and the portfolio itself.

Figure 2:
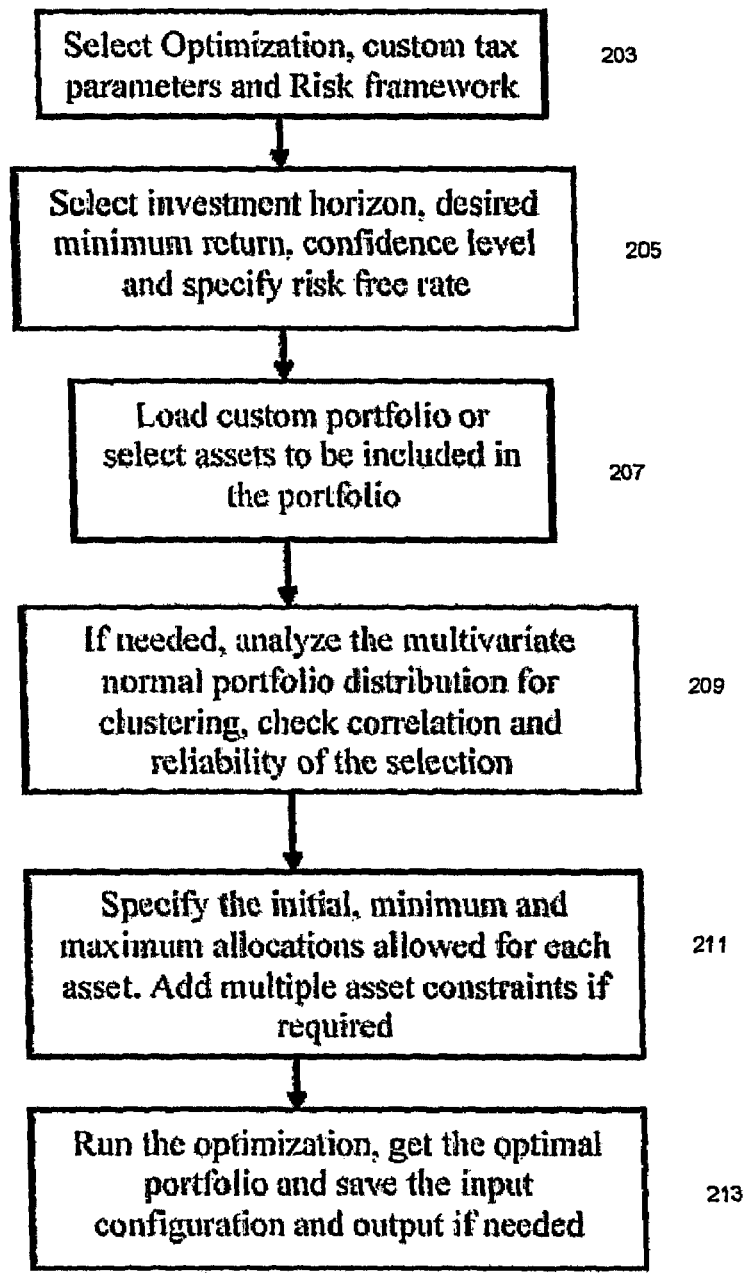
FIG. 2 is a flowchart of operation of the improved resource allocation system disclosed herein.

Overview of Operation: FIG. 2

Flowchart 201 in FIG. 2 presents an overview of how a user of the improved resource allocation system uses the system. If the flowchart 201 of FIG. 2 is compared with the flowchart 101 of FIG. 1, it will immediately be seen that the improved system offers the user many more options. In the system of FIG. 1, the user could only specify a set of asset classes in step 105; everything else was determined by the system from information in the system about the asset classes. In particular, the only objective function available was the Black-Scholes formula and the only volatility measure that could be employed in the Black-Scholes formula was the standard deviation for the portfolio's assets over time T; moreover, only a single constraint could be employed in the optimization of the weights of the portfolio's assets, and that constraint was required to be a reliability constraint based on the total return reliability.

As shown in FIG. 2, by contrast, steps 203 through 211 involve setting options for the optimization step 213, which performs operations which correspond functionally to those set forth in steps 107-111 of FIG. 1. In step 203, the user can select from a number of formulas for computing the real option values of the portfolio's assets, can input parameters for the effect of taxes on the portfolio, and can select how the risk is to be defined in the calculation. In step 205, the user can select the investment horizon for the optimization, the desired minimum return, the confidence level desired for the portfolio, and the expected average risk free rate over the investment horizon.

In step 207, the user can specify a previously-defined portfolio for optimization or can select assets to be included in the portfolio to be optimized. In step 209, the user can employ the new capabilities of the improved system to analyze various aspects of the selected portfolio, including analyzing the portfolio for clustering of returns from the portfolio's assets (which increases the risk of the portfolio as a whole), analyzing the correlation matrix for the portfolio's assets, and analyzing the mean-time-to-fail (MTTF) reliability of the returns on the assets in the portfolio.

Step 211 permits the user to specify the initial, maximum, and minimum allocations of the assets selected for the portfolio in step 209 and to specify one or more constraints that must be satisfied by the assets in the portfolio. These constraints will be explained in detail later. Step 213, finally, does the optimization selected in step 203 using the parameters selected in step 205 on the portfolio selected in steps 207 and 209 using the allocations and constraints specified in step 211. For a given optimization, the user may save the input configuration that was set up in steps 203-211 and use it as the basis for a further optimization. In general, what the user inputs in steps 203-211 will depend on what has been previously configured and what is required for the present circumstances.

Figure 3:
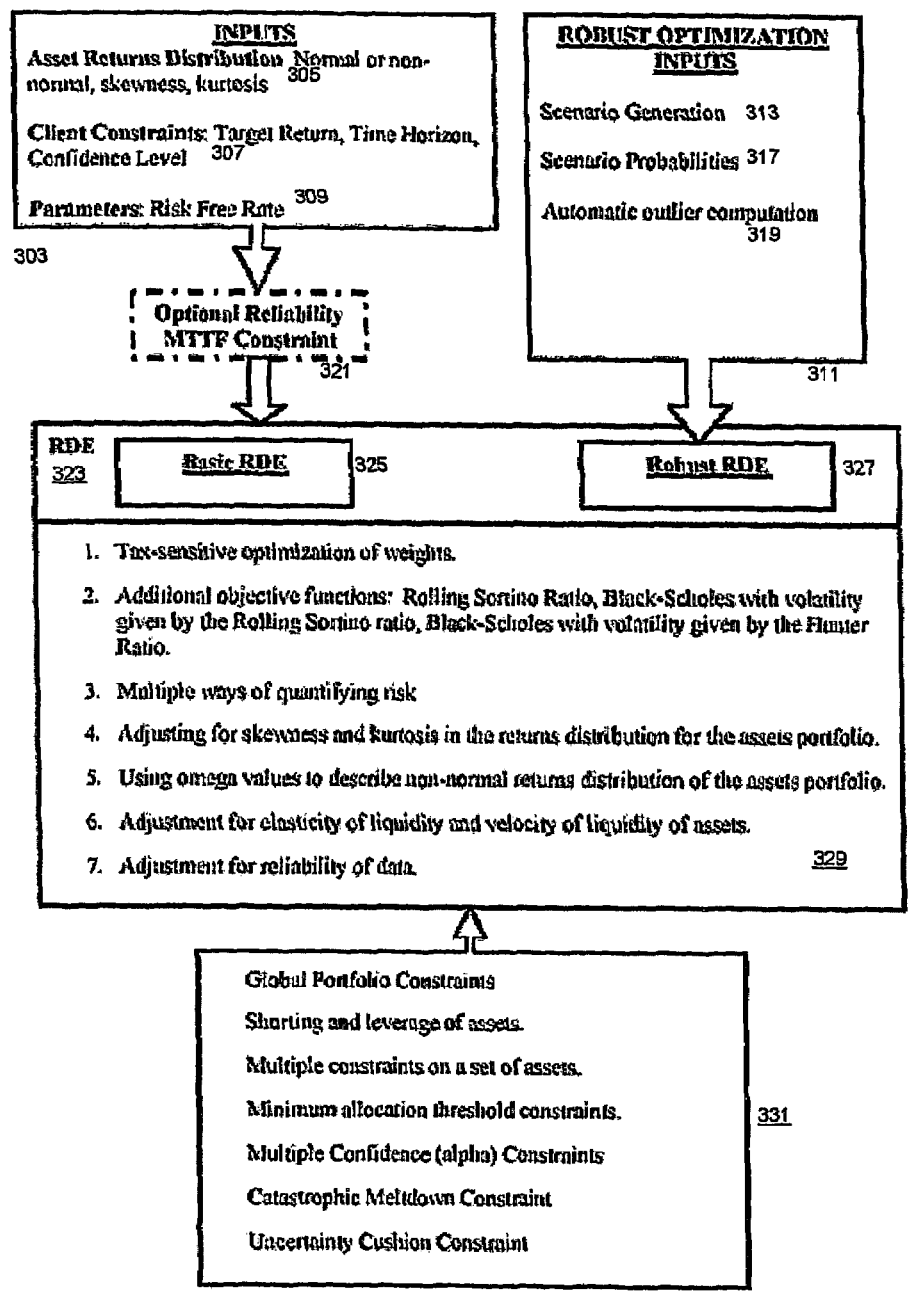
FIG. 3 is a data flow block diagram for the improved resource allocation system.

Overview of Information Flows in the Improved Resource Allocation System: FIG. 3

FIG. 3 is a block diagram 301 that provides an overview of the flows of information in the improved resource allocation system. The information is received in reliability decision engine 323, which allocates the portfolio's assets as required for the desired reliability of the portfolio. In the improved resource allocation system, reliability decision engine 323 includes two reliability decision engines: basic reliability decision engine 325, which optimizes in the general manner described in U.S. Ser. No. 10/018,696, and robust reliability decision engine 327 which optimizes according to scenarios provided by the user. As will be explained later, the use of robust optimization makes it possible to determine the sensitivity of the optimized portfolio to stochastic variations in the input parameters used to compute the optimized portfolio. Portfolios optimized using basic RDE 325 can be further fine tuned using robust optimization. Alternatively, robust optimization can be used from the beginning. Scenarios can be specified directly by the user or automatically generated by the system in response to a selection by the user.

Inputs provided by the user to the RDE are shown at 303, 311, 329, and 331. Inputs 329 and 331 may be applied to both reliability engines; inputs 303 are applied to basic RDE 325 and inputs 311 are applied to robust RDE 327. The inputs fall generally into two classes: inputs which determine how RDE 329 performs its computations and inputs which describe the constraints that apply to the optimization. To the former class belong inputs 305 and 329; to the latter belong inputs 307, 313,317, and 331. All of these inputs will be described in detail in the following. Optional reliability MTTF constraint 321 permits the user to select the assets in a portfolio according to whether the portfolio with the selected assets has a desired MTTF reliability. If the MTTF reliability is not what is desired, no optimization of the portfolio is done and the user selects different assets for the portfolio.

Overview of the User Interface for the Improved Resource Allocation System: FIGS. 4, 6-7, 13

Figure 4:
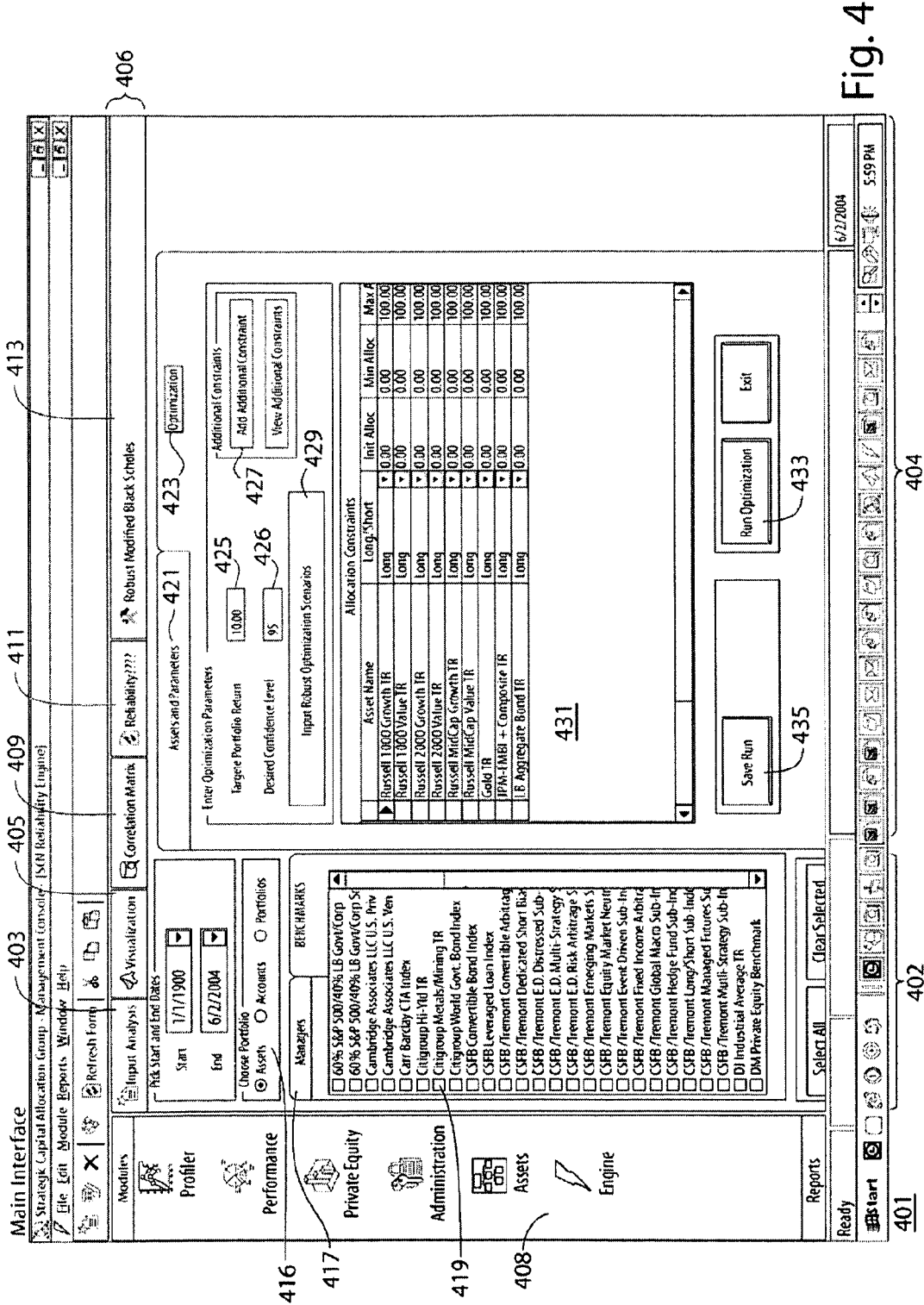
FIG. 4 shows the top-level graphical user interface for the improved resource allocation system.

The top-level user interface for the improved resource allocation system is shown in FIG. 4. It is a typical windowing user interface. The top level window 401 of the user interface has four main parts: portfolio selection portion 402, which the user employs to select a portfolio of assets or of benchmarks; optimization portion 404, which provides parameters for the optimization of the portfolio of assets selected by the user in portion 402, and portfolio analysis tools at 406. Module selection portion 408, finally, permits selection of other modules of the asset management system of which the improved asset allocation system is a component. Of these modules, the ones which are important in the present context are the asset module, which accesses assets and information about them, and the Profiler™ module, which permits detailed analysis of the behavior of sets of assets. The Profiler is the subject of the PCT patent application, PCT/US02/03472, Hunter, System for facilitation of selection of investments, filed 5 Feb. 2002.

Beginning with portfolio selection portion 402, at 415, the user selects a period of time from which the data about the assets in the set of assets to be optimized will be taken At 416, the user can choose among ways of specifying portfolios: by selecting from a list of assets 417 or benchmarks 419, by selecting from a list of portfolios that are ordered by the user's clients, or by selecting from a list of named portfolios. The names of the portfolios are generated automatically by the improved resource allocation system. The naming convention is [Client Initials]_[Date]_[Time Horizon]_[Target Return]_ [Additional Constraints in short]. At 419 is shown a list of benchmarks from which a portfolio may be formed; a benchmark is added to a portfolio by checking the box to the left of the benchmark.

Figure 6:
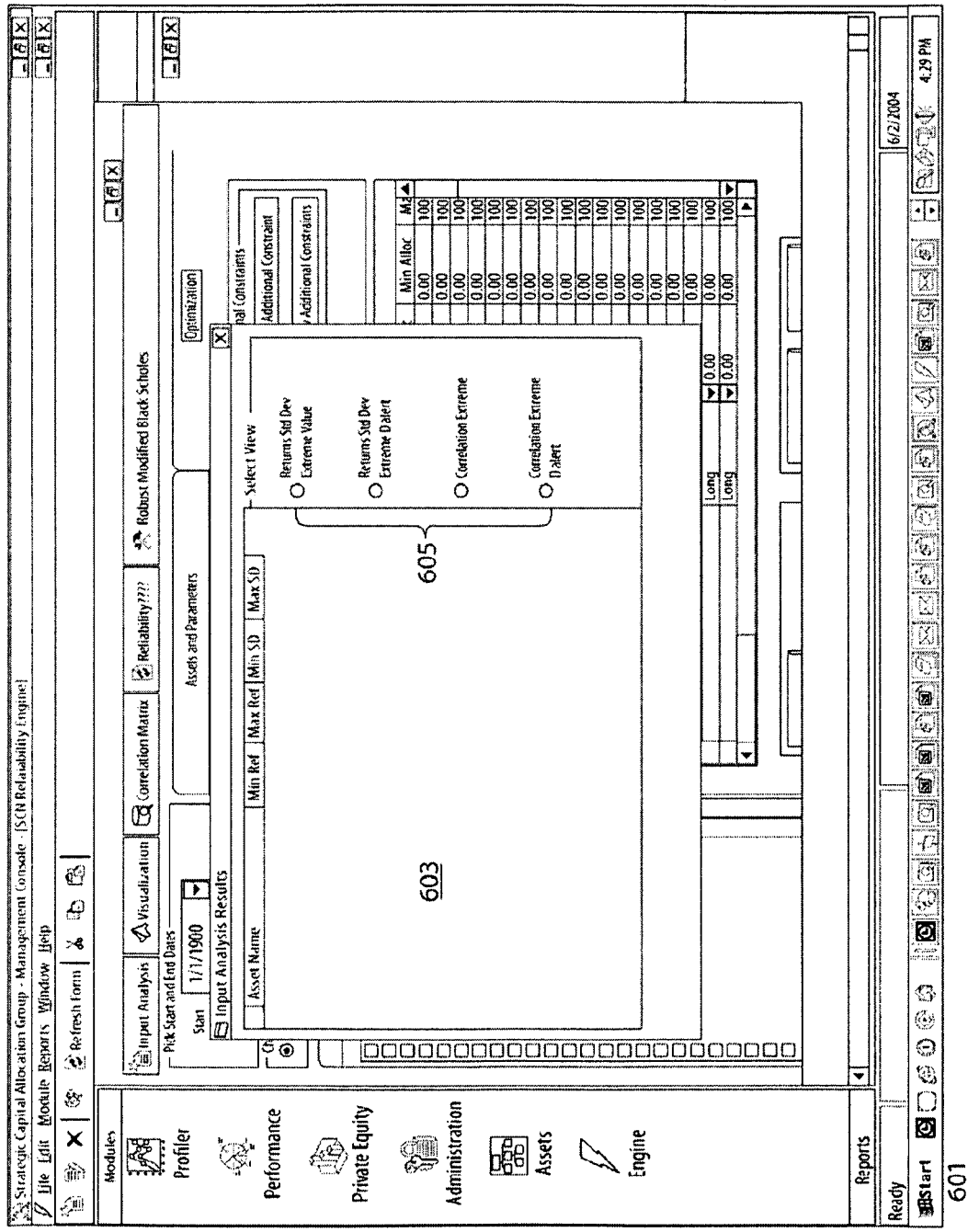
FIG. 6 shows the graphical user interface for the input analysis tool.
Figure 7:
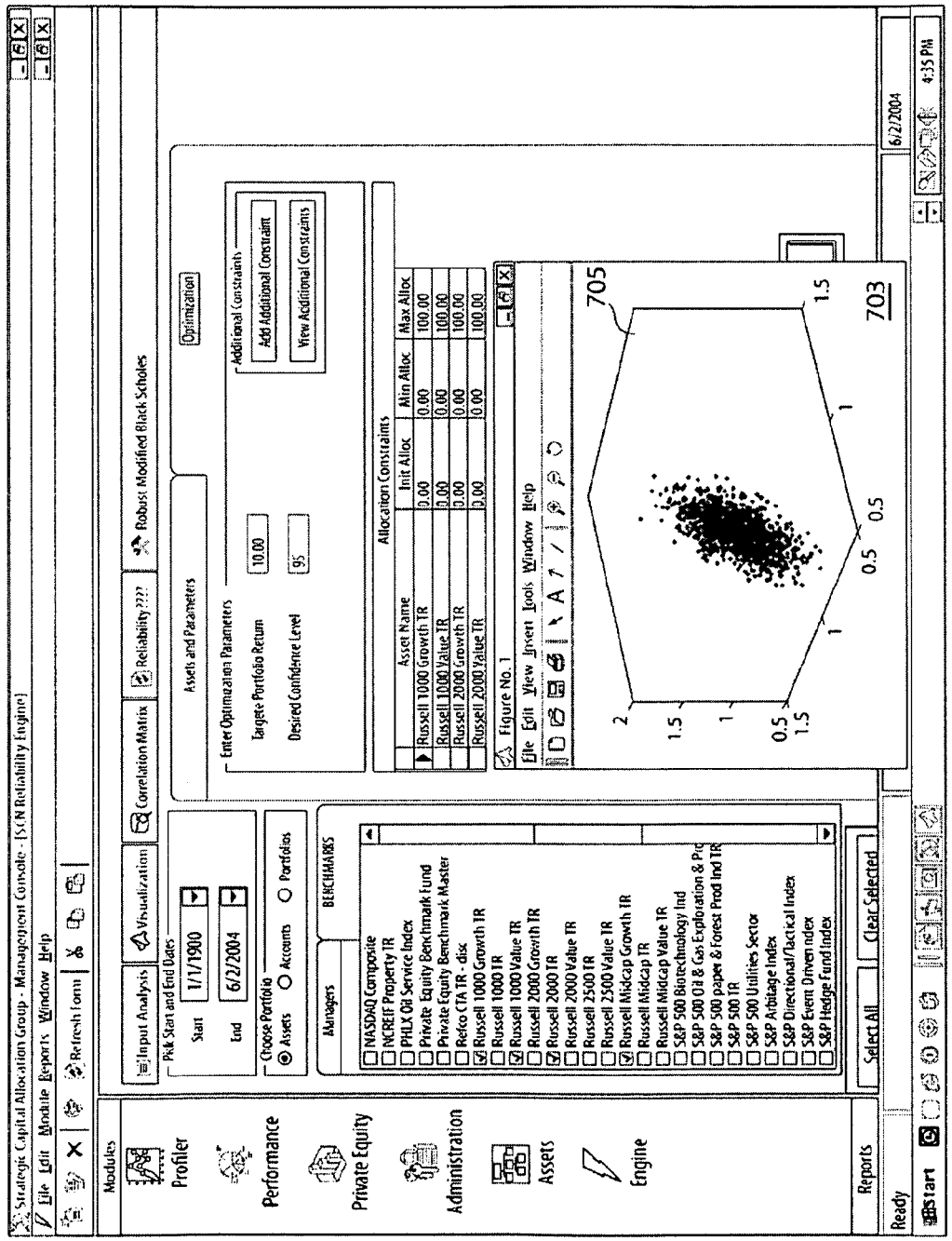
FIG. 7 shows the graphical user interface for the visualization tool.

Once a portfolio has been selected, it can be analyzed using the tools at 406. Input analysis tool 403 permits the user to do detailed analysis of the set of assets being analyzed. In a preferred embodiment, the kinds of detailed analysis available include extreme values for the return and standard deviation of an asset in the set, extreme dates for the return and standard deviation, extremes in the correlation matrix for the set of assets, and extreme dates for the correlation matrix. Visualization tool 405 permits the user to visualize clustering in the multivariate normal distribution for the portfolio. Correlation matrix tool 409 permits the user to see the correlation matrix for the portfolio. Reliability tool 411 permits the user to compute the MTTF reliability for the portfolio. Objective function selection tool 413 permits the user to select one of a number of objective functions. The selected function is then used in the optimization. Where further user input is required after selection of one of these functions, selection of the function results in the appearance of a window for the further user input. This is illustrated in FIG. 6, which shows display 601 that results when input analysis tool 403 is selected. Window 603 appears and the user selects the kind of analysis desired at 605. The result of the selected function appears in another window. Display 701 in FIG. 7 shows window 703 which contains a graph 705 that shows clustering of returns in the multivariate normal distribution for the portfolio. The window appears when the user clicks on visualization tool 405.

Figure 13:
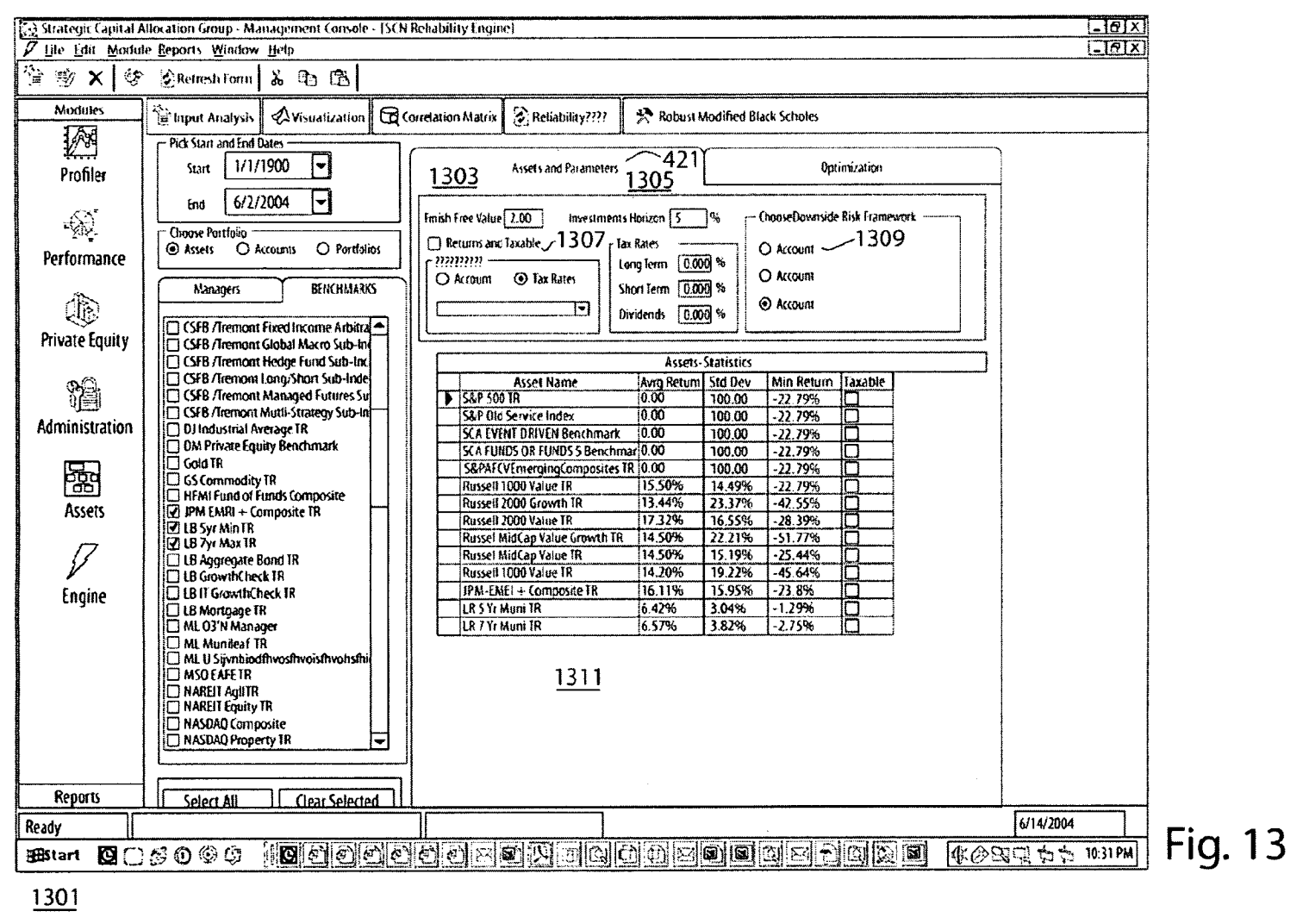

The user provides additional information needed to do an optimization in optimization portion 404. Optimization portion 404 has two main parts: Assets and parameters 421 permit the user to specify the investment horizon, the risk free rate, downside risk options, whether returns are taxable or not, tax rates if applicable, and automatic extraction of tax rates for the account information for the account for which the optimization is being performed. The interface 1301 that appears when the user clicks on assets and parameters tab 421 is shown in FIG. 13. At 1303, the user specifies the risk-free rate of return that is expected during the investment horizon for which the optimization is being performed. At 1305, the user specifies the investment horizon, i.e., the period of time for which the optimization is being performed. At 1307, the user inputs tax information for the account for which the optimization is being done. Included are whether the returns are taxable and the account's tax rates for long term gains, short term gains, and dividends. At 1309, the user selects one of three modes of quantifying downside risk: whether it is uniform at −10% for all assets, whether it is based on the standard deviation, or whether it is based on the worst annual rolling returns for the assets. At 1311 are listed the assets that make up the portfolio together with statistics concerning the asset's return. Checkboxes in the rightmost column permit the user to indicate whether the asset's returns are taxable.

Optimization part 423 permits the user to input constraints on the optimization such as the targeted return on the portfolio at 425, the level of confidence that the portfolio will provide the targeted return at 426, and additional constraints at 427. At 429, the user may input robust optimization scenarios for use when the user has selected an objective function that does robust optimization. At 431 is a list of the assets in the portfolio; using the list, the user can specify allocation constraints including a maximum, minimum, and initial allocation for each asset in the portfolio; the user can also indicate whether an asset may be "shorted", i.e. borrowed from a willing lender, sold for a price A, and then purchased for a price B which is hopefully lower than A, and returned to the lender. Since a shorted asset is "owed" to the lender, the shorted asset's minimum allocation for the portfolio may be negative.

Figure 9:
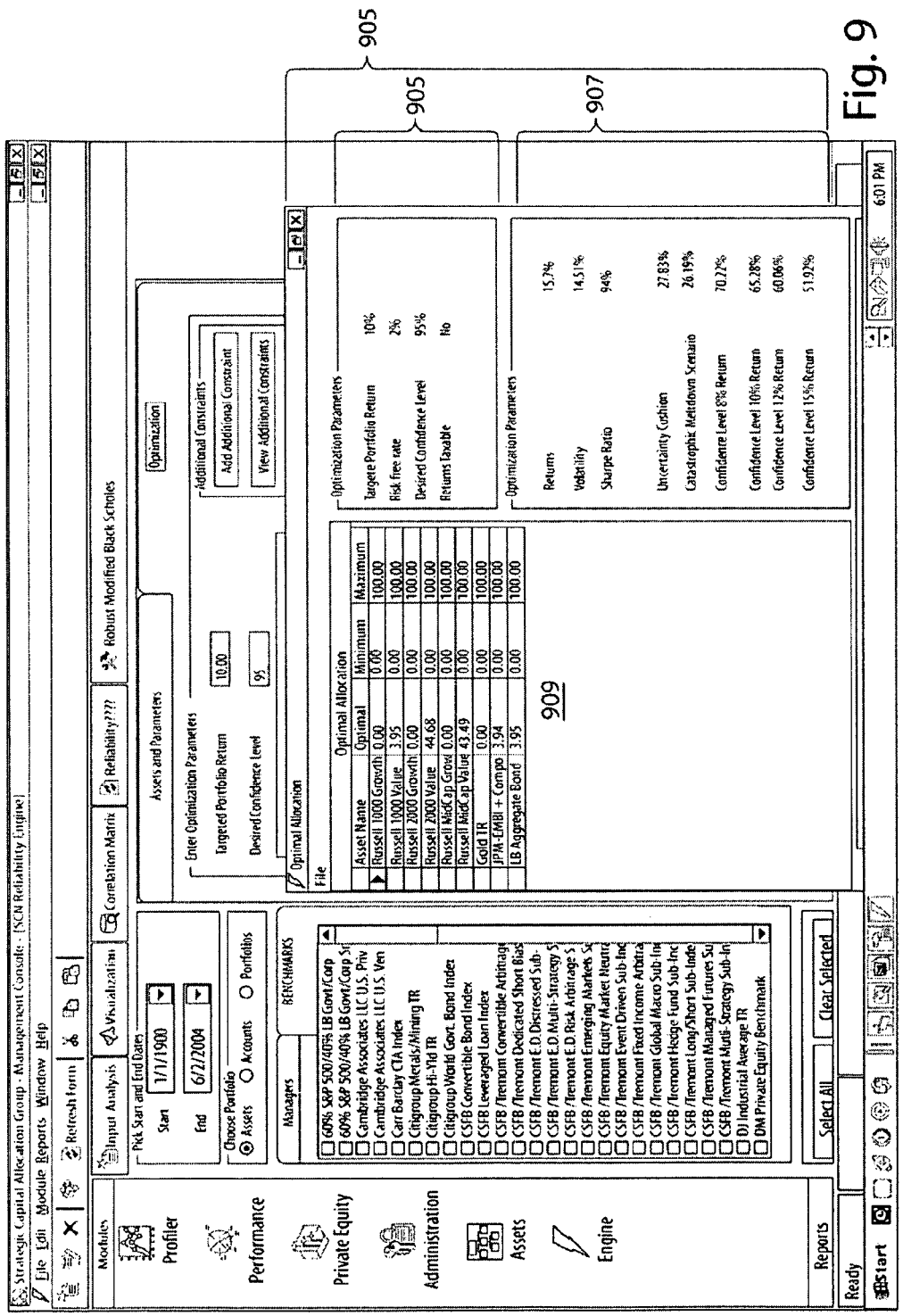
FIG. 9 shows the window that appears when RDE 323 has completed an optimization.

Once all of the information needed for the optimization has been entered, the user clicks on run optimization button 433 to begin the optimization. The asset allocation system then runs until it has produced an optimized portfolio which to the extent possible conforms to the constraints specified by the user. FIG. 9 shows graphical user interface 901 with the results of an optimization. Optimization result window 903 has three main parts: list 909 of the assets in the portfolio, with the optimal weight of each asset. Note that the optimal weight for some of the assets is 0. At 905 are listed parameters used in the optimization and at 907 are shown the results of the optimization for the portfolio as a whole. Of particular interest in the results are the uncertainty cushion and catastrophic meltdown scenario, both of which will be described later, and the list of confidence levels for a range of different rates of return.

If the user believes the optimized portfolio is worth saving, the user pushes save run button 435 which saves the optimized portfolio resulting from the run and the information used to make it. The optimized portfolio can then be further analyzed using the improved resource allocation system. For example, once a satisfactory optimized portfolio has been obtained using basic RDE 325, scenarios of interest and their probabilities can be specified and the optimized portfolio can be used as a scenario in robust optimization. A saved portfolio can also be periodically subjected to MTTF analysis or reoptimization using current data about the returns and/or risks for the asset to determine whether the portfolio's assets or the assets' weight in the portfolio should be changed.

Selecting a Set of MTTF-reliable Assets

Definitions and Assumptions

The following discussion uses the following definitions and assumptions:

Definition of an Asset

Initially, an asset A is simply defined as an entity whose returns follow a normal distribution. Thus each asset is represented by its mean and the variance. This is a fundamental assumption of several techniques in finance theory, and is necessary for and consistent with the assumptions used in the Black-Scholes option valuation technique. In the following theoretical discussion, this is the only assumption that we will make about the nature of the asset.

Assumption Concerning the Return on an Asset

We initially assume that the return on an asset $\tilde{r}_A$ is a normally distributed random variable.

$$\tilde{r}_A \sim N(r_A, \sigma_A^2)$$

While this assumption may not be valid for all assets, we see that for assets with a history more than 3-4 years, the asset returns distribution is pseudo-normal.

The normal distribution has a property that it can be completely described by two parameters: its mean and variance, which are respectively, the first and second moments of the asset returns distribution. When a random variable is subject to numerous influences, all of them independent of each other, the random variable is distributed according to the normal distribution. The random distribution is perfectly symmetric—50% of the probability lies above the mean. For the normal distribution, the probability of the random variable lying within the limits of (m−s) and (m+s) is 68.27 % and within (m−2s) and (m+2s) is 95.45 %.

Measuring the Reliability of a Portfolio

In U.S. Ser. No. 10/018,696, the reliability of a portfolio of weighted assets was measured in terms of the probability that the portfolio will yield a desired minimum return $r_{MIN}$. When the portfolio was optimized, the constraint under which the portfolio was optimized was that the probability that $r_{MIN}$ would yield a given minimum return be greater than $\alpha$. In the following, this measure of reliability is termed total return reliability. In the improved asset allocation system, an additional measure of reliability is employed: mean time to fail (MTTF) reliability. The MTTF reliability of a set of assets is the probability that during a given period of time one or more of the assets in the set will not provide the minimum return desired for the asset.

It should be noted here that the MTTF reliability of a set of assets is independent of the weight of the assets in the set and can thus be used as shown at 321 in FIG. 3 to validate the selection of the set of assets making up a portfolio prior to optimizing the portfolio. An important feature of the improved asset allocation system is that it includes such a selection validator 321 in addition to RDE optimizer 323. The following discussion will show how the MTTF reliability for a set of assets is computed and how the computation is used in the improved asset allocation system. The total return reliability will be discussed in detail along with the other constraints used in optimization.

We will begin the discussion of MTTF reliability by showing how the multivariate normal distribution for a portfolio can be used to determine the probability that each asset in a portfolio will perform, i.e., meets a desired minimum return on the asset.

Figure 5:
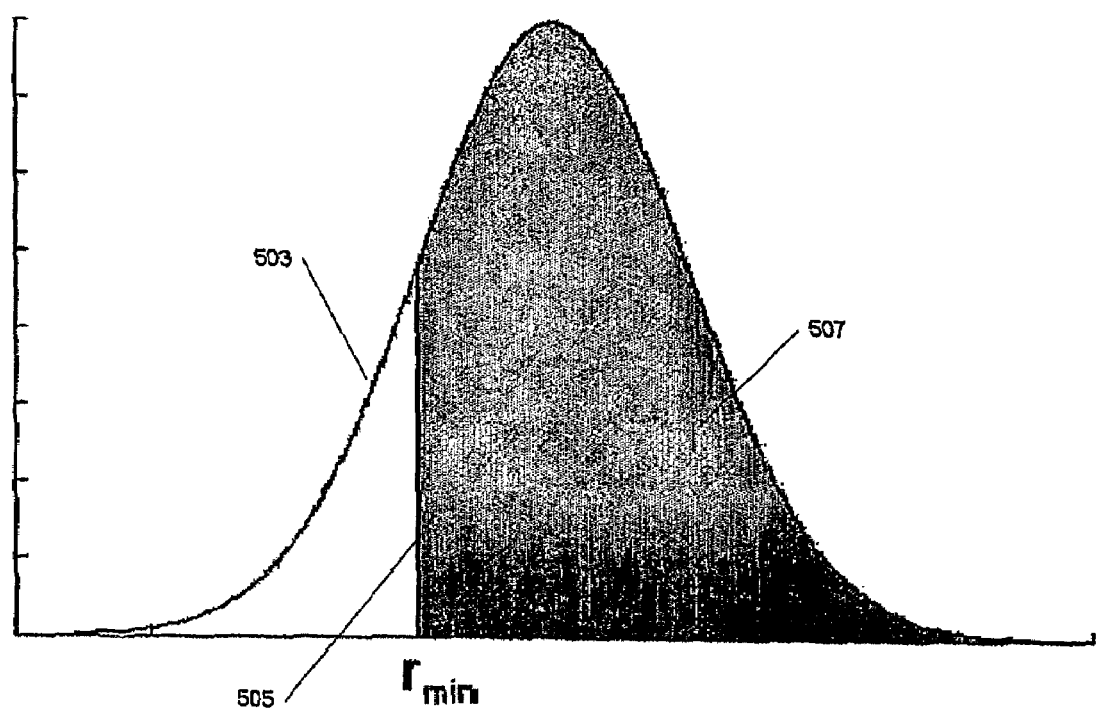
FIG. 5 shows the probability distribution for the probability that the return from a single asset will exceed a minimum.

Using the Multivariate Normal Distribution to Determine the Probability that an Asset will Perform: FIG. 5

Let U be the universe of such assets A, B, C . . . N.

We know that $\forall$ Asset $A \in$ Universe $U \Rightarrow \tilde{r}_A \sim N(\mu_A, \sigma_A^2)$ $$\text{Let } \tilde{R} \equiv \begin{bmatrix} \tilde{r}_A \\ \tilde{r}_B \\ \tilde{r}_C \\ \vdots \\ \tilde{r}_N \end{bmatrix},$$

be the random variable associated with the portfolio returns $\mu \equiv E[\tilde{R}]$, the mean of the portfolio returns and $V \equiv Var(\tilde{R})$, the variance of the portfolio returns Therefore the multivariate normal distribution is given by:

$$\tilde{R} \approx N_{\|Universe\ U\|}(\mu, V), \text{ where}$$

$$\mu = \begin{bmatrix} E[\tilde{r}_A] \\ E[\tilde{r}_B] \\ E[\tilde{r}_C] \\ \vdots \\ E[\tilde{r}_N] \end{bmatrix} = \begin{bmatrix} \mu_A \\ \mu_B \\ \mu_C \\ \vdots \\ \mu_N \end{bmatrix} \text{ and}$$

$$V = \begin{bmatrix} \sigma_A^2 & \rho_{A,B}\sigma_A\sigma_B & \cdots & \rho_{A,N}\sigma_A\sigma_N \\ \rho_{A,B}\sigma_A\sigma_B & \sigma_B^2 & \cdots & \rho_{B,N}\sigma_A\sigma_N \\ \vdots & \vdots & \ddots & \vdots \\ \rho_{A,N}\sigma_A\sigma_N & \rho_{B,N}\sigma_B\sigma_N & \cdots & \sigma_N^2 \end{bmatrix}$$

$\tilde{R}$ is a random vector of portfolio returns. Since $\tilde{R}$ is a function of N random variables, each following a normal distribution, $\tilde{R}$ follows a multivariate normal distribution.

The justification for construction of the multivariate normal distribution is as follows. From the universe of possible assets U, let us identify a subset Q ($Q \subseteq U$) of assets upon which we wish to place an additional constraint. Consider an investor who, for each asset A belonging to Q, requires that the return on that asset be above a threshold minimum return $r_{min,A}$. Since the asset returns in Q are jointly normally distributed, it is possible to ex ante calculate the probability of this event occurring.

Illustrating this constraint when Q contains a single asset X is easy. As just shown, our chosen asset X has returns $\tilde{r}_x$ that are normally distributed with mean $\mu_x$ and variance $\sigma_x^2$. There are no constraints on any other asset in U. Therefore, the only relevant asset return distribution to consider is the distribution of asset return $\tilde{r}_x$, which is depicted in FIG. 5. Because the returns are normally distributed, they form a bell curve 503. Line 505 shows the minimum desired return. The probability that $\tilde{r}_x$ exceeds $r_{min,x}$, $Pr(\tilde{r}_x > r_{min,x})$, is represented by the area of shaded portion 507. Let us call the probability represented by shaded portion 507 probability p. Elementary probability gives us the value of p; it is simply $$\Phi\left(\frac{\mu_X - r_{min,X}}{\sigma_X}\right),$$

the value associated with the cumulative distribution of asset X at $r_{min,X}$.

Let us now return to our investor in order to understand the significance of this calculation for asset allocation systems like the one disclosed here and the one disclosed in U.S. Ser. No. 10/018,696, which will be termed in the following real option value asset allocation systems. At the simplest level, p is exactly what we defined it to be—the probability of the return on asset X exceeding the minimum return on that asset. But this same number has other meanings. In real option value asset allocation systems, p also gives us the probability that a real option drawn on asset X is "in-the-money" at the end of the option period. This probability is important because real option value asset allocation systems only value future states of the world where the return on an asset is equal to or exceeds the minimum return on that asset. Put another way, real option value asset allocations systems favor options that will be "in-the-money" and thereby maximize upside potential. Future states of the world in which assets perform below minimum are not valued, and do not contribute to the asset weights used during optimization.

Thus, the probability that an investment in asset X "performs", or is "in-the-money" gives the user of a real option value asset allocation system a value which can be used to validate the asset weights used in the optimization. As will be seen later, it can also be used to construct a measure of reliability for a set of assets.

In order to build intuition, let us extend this example to case when Q={X, Y}, but restrict ourselves to the improbable scenario where $\tilde{r}_X$ and $\tilde{r}_Y$ are uncorrelated and hence independent. The probability that the minimum return criterion is met for both asset returns is given by the expression $Pr(\tilde{r}_X > r_{min,X}) \cdot Pr(\tilde{r}_Y > r_{min,Y} | \tilde{r}_X > r_{min,X})$. Since $\tilde{r}_X$ and $\tilde{r}_Y$ are independent, the conditional probability expression $Pr(\tilde{r}_Y > r_{min,Y} | \tilde{r}_X > r_{min,X})$ collapses to the simpler expression $PR(\tilde{r}_Y > r_{min,Y})$. Hence the probability that the minimum return criterion is met for both asset returns is given by the expression $$\Phi\left(\frac{\mu_X - r_{min,X}}{\sigma_X}\right) \cdot \Phi\left(\frac{\mu_Y - r_{min,Y}}{\sigma_Y}\right).$$

This is similar to the expression derived in the first example.

Unfortunately, the elegance of this solution is based upon the unrealistic assumption of independence amongst asset returns. In the general case, correlations amongst asset returns are significant and may not be ignored in this fashion.

Let U={A, B, C ... M}, with correlated asset returns

Let $p = Pr(\tilde{r}_A > r_{min,A} \text{ AND } \tilde{r}_B > r_B \text{ AND}, \ldots \tilde{r}_M > r_{min,M})$ In the general case, $$p = \int_{r_{min,M}}^{\infty} \cdots \int_{r_{min,C}}^{\infty} \int_{r_{min,B}}^{\infty} \int_{r_{min,A}}^{\infty} f_{\|U\|}(a, b, c \ldots m) \partial a \partial b \partial c \ldots \partial m$$

In the above equation, $f_{|Q|}(\cdot)$ is the probability density function for a multivariate normal distribution. Thus p is the probability that each of the selected assets meet its desired minimum return in the investment period. Since each of these normally distributed assets is correlated, the returns on the portfolio as a whole obey the multivariate normal distribution. Therefore the probability that each asset in the selected set 'performs' i.e. meets the desired minimum return on that asset is the value associated with the multivariate cumulative distribution of portfolio returns evaluated at the desired minimum returns, given by p in the above equation.

Using p to Compute the MTTF Reliability of a Portfolio p can be used to compute the MTTF reliability of a portfolio of assets. Under the normality assumption, the ex ante probability distribution of $\tilde{r}_X$ is a normal distribution as shown in FIG. 5. Shaded area 507 gives us the region where $\tilde{r}_X$ exceeds the minimum return. Area 507 may also be interpreted as the number of all possible future outcomes in which the minimum return constraint is met. Since the objective function assigns weights to the portfolio's assets under the assumption that the strike price of the asset option is the minimum return, area 507 is proportionate to the total number of future outcomes in which the construction of the objective function is accurate. Let this number be n(T) Now, let $n_0(T)$ denote the total number of possible future outcomes. In this case, the reliability of the objective function reduces to $n(T)/n_0(T)=p$.

Because this is so, p is also a reliability measure for the objective function. Validator 321 determines p for a given set of assets and a given period of time. Since p is the probability that each of the assets will perform in the given period and the mean-time-to-failure reliability (MTTF) for a given period of time for the portfolio is the probability that one or more of the assets will not perform during the given period of time, $MTTF=1-p$ Using Validator 321 to Select Assets for a Portfolio Validator 321 works as follows: the user selects a set of assets using selection part 402 of the graphical user interface and then clicks on MTTF tool button 411. The asset allocation system responds to those inputs by computing the MTTF reliability of the set of assets. The reliability of the set is 1−p, and the value of that expression appears as a percentage on button 411 in the place of the question marks that are there in FIG. 4. For example, if p has the value 0, 100% appears on button 411.

Efforts were made to optimize the selection of the assets themselves. The idea was to come up with a set of assets with an optimal MTTF reliability and to then optimize the weights of the assets in a portfolio made up of the set or assets. However, the optimization for MTTF reliability has an exponential running time. Say we have n assets to choose from. The number of possible sets with these n assets would be $2^n$. Moreover, since these are discrete states, we cannot devise an intelligent way to traverse these sets to get the optimal set. Given that the running time for optimizing MTTF reliability is exponential, it is much more efficient to allow the user to select the assets in the allocation and have the system determine the MTTF reliability of the selected set. Once the user is satisfied with the MTTF reliability of a set of assets, he then uses optimization part 404 of the user interface to optimize the weights of the assets in the portfolio made up of the set with the satisfactory MTTF reliability.

Robust Optimization

Introduction

In optimization as performed by basic reliability decision engine 325, the optimization has the following characteristics:

The real option value of a portfolio of assets is maximized subject to constraints of non-linear reliability, upper and lower bounds on each asset and upper and lower bounds on linear combinations of assets, with or without shorting and with or without leverage.

The objective function and the constraints are computed using the means and covariances provided by historical asset returns A necessary limitation of this kind of optimization is that these means and covariances are historical. They describe past behavior of the assets over relatively long periods and by their very nature cannot describe the behavior of the assets in times of crisis. For example, in times of crisis, assets that bear a low correlation with the broad indices and with each other in normal times, have been known to get highly correlated. Further, times of crisis are normally associated with a serious liquidity crunch and the crunch occurs just at the time when all asset correlations rapidly grow towards 1.

Robust optimization deals with the fact that it is uncertain whether the historical trends for an asset or a set of assets would continue into the future. Robust optimization has its origins in control systems engineering. The aim of robust optimization is to take into account inherent uncertainties in estimating the average values of the input parameters when arriving at an optimal solution in a system which in our case is defined by a set of non-linear equations. Where the standard optimization program takes an individual parameter as input, the robust optimization program expects some measure of central tendency for the input parameter and a description of stochastic variation of the actual input parameter from that measure. In the context of the optimization done by RDE 323, this approach is applied to the mean, standard deviation and correlations which serve as parameters for the optimization. Thus, in the optimization performed by robust RDE 327, an additional input is added, namely, a measure of the stochastic variation associated with the mean, standard deviation, and correlation parameters describing the returns distribution. Of course, the same constraints can be used with the robust optimization performed by RDE 327 as with the basic optimization performed by RDE 325.

It is important to note that the notions of reliability and robustness are orthogonal to each other. In the context of RDE 323, reliability is a check on the validity of the constructed objective function whereas robustness is a measure of the sensitivity of the optimization output to stochastic variations in the input parameters.

Details of Robust Optimization in the Improved Resource Allocation System

Scenarios for Robust Optimization

Robust RDE 327 performs robust optimization of a set of assets on the basis of a set of possible extreme scenarios. Each scenario is described using the mean return, $\mu$, and the covariance matrix $\Sigma$ for the set of assets. Each of the extreme scenarios also includes a probability of the scenario's occurrence. Robust RDE 327 maximizes the worst-case real option value of a portfolio of assets over the set of scenarios, each with a given probability of occurrence. The objective function for the robust optimization performed by RDE 327 is:

$$\underset{W}{\text{Maximize}} \underset{\mu, \Sigma \in S \ldots 1:k}{\text{Min}} \sum_i (v_i^T \cdot x_i),$$

where $v_i$ and $x_i$ are the adjusted real option value and the allocation to asset i respectively and set $$S = \left\{ \sum \in R^{n \times n} | \sum \geq 0, \sum_{i,j} \leq \sum_{i,j} \leq \overline{\sum_{i,j}} \right\}$$

is comprised of scenarios 1 through k, the total number of independent scenarios and covariance matrix $\Sigma$ is positive semi-definite and bounded subject to the two stochastic variation constraints:

$$\underline{\mu_i} \leq \mu_i \leq \overline{\mu_i}$$

$i = 1, \ldots n$ and $$\sum_{i,j} \leq \sum_{i,j} \leq \overline{\sum_{i,j}}$$

$i, j = 1, \ldots, n,$ where the estimate of the mean return for an asset and elements of the covariance matrix lie between two extremities given by the stochastic variation of the mean and covariance respectively.

Figure 8:
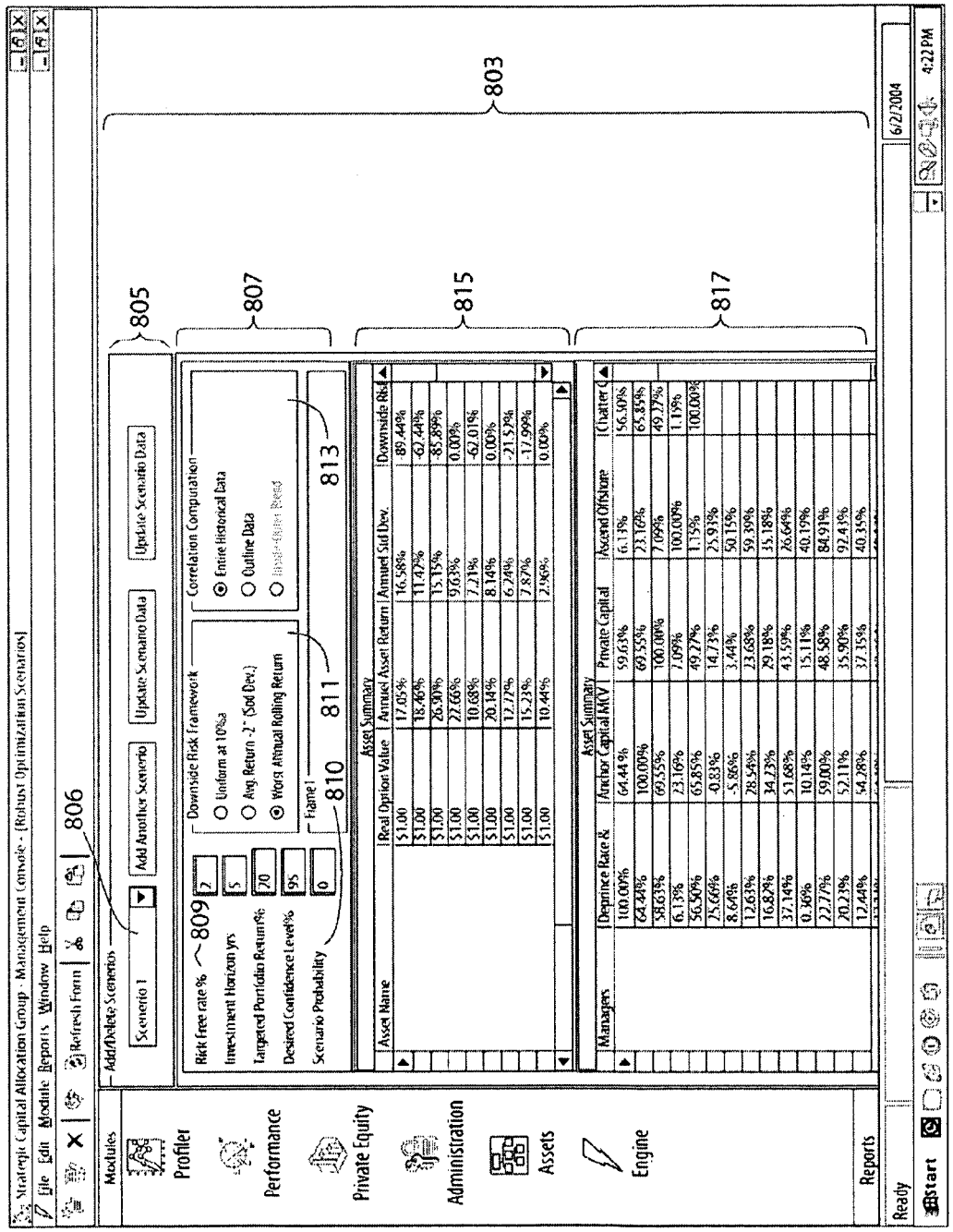
FIG. 8 shows the graphical user interface for defining a scenario.

The above optimization problem is convex overall and RDE 327 solves it using the techniques and algorithms of conic convex programming described by L. Vandenberghe and S. Boyd in SIAM Review (38(1):49-95, March 1996) and software for convex SCONE programming available as of June, 2004 through S. Boyd at www.stanford.edu/~boyd/SOCP.html The Interface for Defining Scenarios: FIG. 8

In a preferred embodiment, the user defines scenarios for a particular set of assets. The user can specify properties for a scenario as follows:

the desired performance for the scenario;
the probability of the scenario's occurrence;
the downside risk for the scenario; and
how the correlation between the assets is to be computed.

FIG. 8 shows the user interface 801 for doing this. The set of windows shown at 803 appear when the user clicks on "Input robust optimization scenarios" button 429. At 805 are seen a drop-down list of scenarios, with the name of the scenario presently being defined in field 806 and a set of scenario editing buttons which permit the user to add a scenario, update the assets to which the scenario in field 806 applies, and delete that scenario. The assets for the scenario specified in box 806 are shown in list 815.

Windows 807, 815, and 817 contain current information for the scenario whose name is in field 806. The fields at 809 permit the user to specify assumptions for the scenario including the risk-free interest rate, the investment horizon, the desired portfolio return, correlations between the assets, and the desired confidence level for the portfolio. At 810, the user inputs the probability of the scenario. The user employs the buttons at 811 to select the downside risk the optimizer is to use in its calculation and the buttons at 811 to select the source of the values for the correlation matrix to be used in its calculation.

The buttons in correlation computation 813 permit definition of the following types of scenarios in a preferred embodiment:

1) A scenario where means and covariance between assets are equal to parameters calculated from historical data. This scenario is the one corresponding to the optimization done by basic RDE engine 325.
2) A scenario in which the covariance matrix is estimated from outliers in the asset returns. This may better characterize the "true" portfolio risk during market turbulence than a covariance matrix estimated from the full sample.

The user may set up his own scenario in which correlations between all or some assets become 1, i.e. assets get highly correlated by inputting such correlations to the correlation matrix for the set of assets (mean returns may be assumed to be equal to historical mean returns). The ability to handle means and covariances for other types of scenarios may be incorporated into robust RDE 327.

One example of another type of scenario is the following: If we are able to forecast the mean/covariance matrix for some assets, each set of such forecasts would potentially constitute a scenario. Forecasts of returns based on momentum, market cycle, market growth rates, fiscal indicators, typical credit spreads etc. could be used for scenarios, as could forecasts of the risk free rate, drawdown etc. of specific assets. The forecasts can be obtained from external forecasting reports.

In addition to using different sources for the means and covariances in the scenarios that the robust optimizer is optimizing over, it is also possible to use different objective functions in different ones of the scenarios, with the objective function employed with a particular scenario being the one best suited to the peculiarities of the scenario.

Maximizing the worst-case real option value of the portfolio of assets for all scenarios defined for a portfolio may not be suited for all applications. One situation where this may be the case is if one or more of the scenarios has a very small probability of occurrence. Another such situation is when the scenarios defined for the portfolio include mutually exclusive scenarios or nearly mutually exclusive scenarios. To deal with this, the defined scenarios can be divided into sets of mutually-exclusive or nearly mutually-exclusive scenarios and the probability of occurrence specified for each of the scenarios in a set. The robust objective function could then maximize on the basis of the probabilities of occurrence of the scenarios of a selected set.

Scenario Generation Using Outliers

A button in correlation computation area 813 permits the user to specify outliers in the historical returns data as the source of the correlation matrix for the portfolio. Robust RDE 327 then correlates an outlier correlation matrix as follows:

In a preferred embodiment of RDE 323, the correlation matrix is ordinarily computed using a "cut-off" of 75% meaning that if the set of returns falls beyond the cut-off point in the n-dimensional ellipsoid, it is treated as an outlier. The set of returns used to compute the correlation matrix is defined as the n-dimensional ellipsoidal set $$\underset{k}{R} = r^k \{r_1, r_2, \ldots, r_n\}$$

where n denotes the number of assets in the portfolio and k denotes the number of common data points available for the n assets.

When the outlier correlation matrix is being computed, the "cut-off" is used to calculate a composite measure $\zeta$, inverse chi-square value associated with a chi-square distribution characterized by the cut-off value and n degrees of freedom, where n is the number of assets. Now, the outlier-correlation matrix is constructed based on a subset S of the k data points $$S = r^s\{r_1, r_2, \ldots, r_n\} s.t. \ dt(r^s) \geq \zeta, \quad \text{where } dt \text{ is given by}$$

$$dt = (r^k - \mu)^T \cdot \sum^{-1} \cdot (r^k - \mu) r^k \{r_1, r_2, \ldots, r_n\} \in R$$

$\Sigma$ is the covariance matrix for the given scenario and $\mu$ is the vector of estimates for mean returns on the assets. As can be seen, $S \subset R$, i.e. S would be a subset of R.

Doing Robust Optimization

Figure 10:
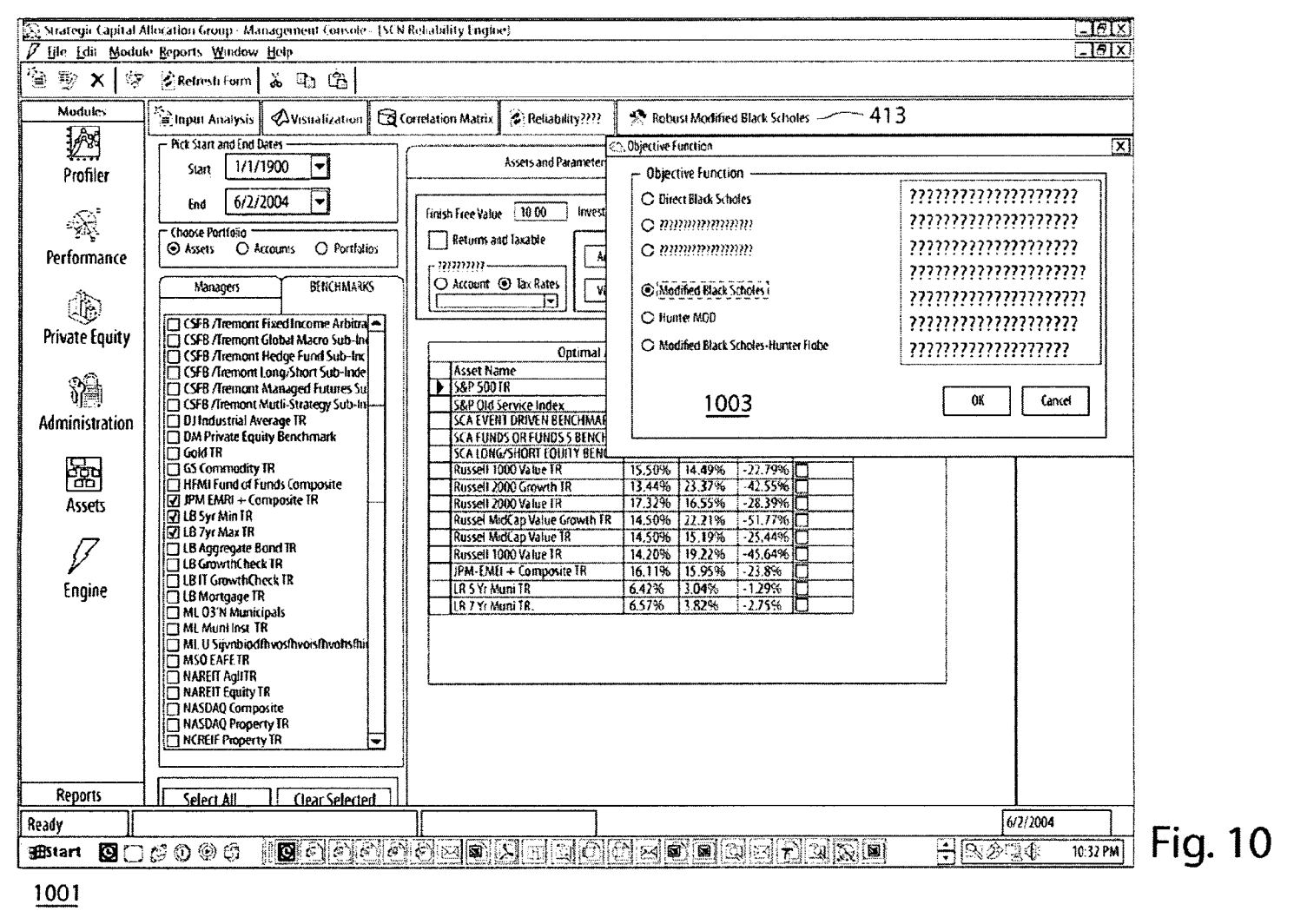

In a preferred embodiment, the user selects robust optimization or basic optimization when the user selects the objective function for the optimization. The user interface for doing this is shown in FIG. 10, described below.

Constraints Employed in the Improved Resource Allocation System

The Total Return Reliability Constraint

This constraint is employed in the improved resource allocation system in the same fashion as in the system of U.S. Ser. No. 10/018,696. It is used in all optimizations done by basic RDE 325 and is one of the correlation computations that may be used to define a scenario in robust optimization.

The formula for this constraint is derived as follows: Consider an allocation vector $$\vec{x} \equiv \begin{bmatrix} x_A \\ x_B \\ x_C \\ \vdots \\ x_N \end{bmatrix},$$

where $x_A$ is the proportion of the portfolio invested in asset A.

If $\tilde{P}$ is the return on a portfolio allocation with weights $\vec{x}$, then $$\tilde{P} \equiv \vec{x}^T \tilde{R} \approx N(r_P, \sigma_P^2)$$

$$r_P = \sum_{A \in U} x_A r_A$$

$$\sigma_P^2 = \sum_{A \in U} \sum_{B \in U} \rho_{A,B} \sigma_A \sigma_B$$

If we place the constraint that the probability that the portfolio yields a desired minimum return $r_{MIN}$ is greater than a desired confidence level $\alpha$, $$Pr(\tilde{P} > r_{MIN}) > \alpha, \text{ Then:}$$

$$Pr(\tilde{P} > r_{MIN}) > \alpha \Rightarrow r_{MIN} < (1 - \alpha) \text{quantile of } \tilde{P} \text{ distribution} \Rightarrow$$

$$\Phi\left(\frac{r_{MIN} - r_P}{\sigma_P}\right) < (1 - \alpha) \Rightarrow \frac{r_P - r_{MIN}}{\sigma_P} > \Phi^{-1}(\alpha)$$

The total return reliability constraint ensures that the probability that the 'returns on the portfolio' exceed the 'minimum desired return on the portfolio' is greater than a confidence level $\alpha$. If that confidence level is not achievable by the selected set of assets for the desired minimum return on the portfolio, then RDE 323 optimizes around a 5% interval around the peak confidence achievable by the selected set for the given desired minimum portfolio return.

User Interface for Defining Constraints: FIG. 4

FIG. 4 shows the user interface used in a preferred embodiment for defining constraints other than the total return reliability constraint at 431. Each asset has a row in the table shown there, and columns in the rows permit definition of the constraints that are explained in detail in the following.

Details of the User-Defined Constraints

Constraints Permitting Shorting and Leverage of Assets

The RDE, in its most basic optimization version, assumes no leverage or shorting, which means that the weights of all the assets in the portfolio are all non-negative and sum up to 1.

No Shorting $0 \leq x_i \leq 1$

No Leverage $\Sigma(x_i)=1$

However, the advanced version of the RDE allows both shorting and leverage.

Shorting

When shorting is allowed, the minimum allocation for an asset may be negative. The previous non-negativity constraint in the optimization algorithm is relaxed for any asset in which it is possible or desirable to take a short position. Thus, the weight of an asset in a portfolio may range between $s \leq x_i \leq l$, where s and l can be negative, positive or zero. Typically, s would not be less than −1 and l not grater than +1, but theoretically, they can take values beyond −1 and 1.

Also, for the short asset the real-option value may be computed using the negative of the mean return for the asset, with the same standard deviation as the long asset. However, while assessing the downside risk of the short asset, the best performing 1-year rolling period of the long asset must be considered as a gauge of the worst-possible downside for the short asset. Alternatively, a maximum annualized trough to peak approach can be used as a downside measure.

Leverage

When leverage is allowed, the sum of the asset allocation can exceed 1 i.e. 100%. The $\Sigma(x_i)=1$ constraint for the weights of the assets in the portfolio would no longer be valid. Instead, the maximum on the sum of allocations would be governed by the leverage allowed.

$S \leq \Sigma(x_i) \leq L$, where S and L are determined by the maximum leverage allowed on the short side and long side.

For example, if maximum allowable leverage is 2× or 200%, then the L would take a value of 2. In case we do not want the portfolio to be net short, S would take a value of zero. Additionally, if we have to be at least 30% net long with a maximum allowable 1.5× leverage, then S=0.3 and L=1.5.

Multiple Asset Constraints

Constraints that specify restrictions on groups of assets may also be employed in RDE 323. For example, the user is able to specify a constraint that the sum of specific assets in the portfolio should have a necessary minimum or an allowable maximum. Any number of such constraints may be added to the optimization, allowing us to arrive at practical portfolios that can be implemented for a particular application.

Also, if we allow selling securities/assets short, resources accumulated by selling-short one asset can be used to buy another asset. Thereby the weight of the asset/s that has been short-sold will be negative and the weights of some of the other assets may even be greater than one. A similar situation might occur when allowing leverage as described in the previous section.

Minimum Allocation Thresholds Constraint

Some assets have a minimum investment threshold which makes any allocation below a specified dollar amount unacceptable. This can be modeled as a binary variable that takes a value zero when the optimal allocation (from the non-linear optimization) is less than the minimum threshold equivalent to the minimum allowable dollar investment in the asset. Such an approach pushes the optimization into the realm of mixed integer non-linear programming wherein we use a branch-and-bound approach that solves a number of relaxed MINLP problems with tighter and tighter bounds on the integer variables. Since the underlying relaxed MINLP model is convex, the relaxed sub-models would provide valid bounds on the objective function converging to a global optimum, giving an allocation that accounts for minimum allocation thresholds for the given set of assets.

Modeling Portfolio Return Reliability with Multiple a Constraints

The total return reliability constraint ensures that the probability of portfolio returns exceeding a minimum desired return is greater than a specified confidence level $\alpha$. However, it is also possible to model the complete risk preference profile of the investor using multiple portfolio confidence constraints. For example, if an investor cannot tolerate a return below 8% but is satisfied with a portfolio with a 60% probability of yielding a return over 12%, then we can model this risk aversion using two return reliability constraints:

Probability of minimum 8% return should be very high, say 99%

Probability of minimum 12% return should be 60%

In the optimization, while inching towards the optimal solution, we make sure that the most limiting return reliability constraint is considered at every iteration. The most limiting constraint is calculated by comparing the values of the specified return reliability constraints at each iteration. Thus the most limiting constraint might change from one iteration to another. Once the most limiting constraint is satisfied, all the other confidence constraints are recomputed to check if they have been satisfied. This is coded in Matlab as a separate constraint function. The optimization moves back and forth between the constraints at each iteration, changing the most limiting constraint but slowly inching towards the optimal solution satisfying all these confidence constraints.

Catastrophic Meltdown Scenario™ and Uncertainty Cushion™ Constraints

RDE 323 employs novel risk measures for assessing the downside risk of a portfolio. Catastrophic Meltdown Scenario™ or CMS is a weighted and summed worst draw-down from each manager based on the worst 1 year rolling returns. Uncertainty Cushion™ or UC provides a measure of the expected performance of a portfolio. UC is defined as the average return for the portfolio minus three times its standard deviation. There is a 0.5% probability that the targeted returns on the portfolio will be less than the Uncertainty Cushion™.

RDE 323 further permits use of these risk measures as constraints on the optimization. Say, for a risk—averse investor who could never tolerate a 10% loss even in the event of a catastrophe in the major markets, we could devise a portfolio with an additional constraint that the CMS be greater than −10% and/or the uncertainty cushion be greater than −10%.

The constraint for the CMS is a linear constraint that can be written as:

$$\sum_i x_i \cdot D_i \geq CMS,$$

where $D_i$ denotes the worst 1-year drawdown for asset i.

The constraint for the uncertainty cushion is non-linear constraint given by:

$$\mu_P - 3\sigma_P \geq UC,$$

where $\mu_P$ and $\sigma_P$ are the mean and standard deviations as calculated for the portfolio respectively.

Objective Functions Employed in the Improved Resource Allocation System: FIG. 10

In the resource allocation system described in U.S. Ser. No. 10/018,696, the only objective function which could be used in optimization was the Black-Scholes formula and the only volatility function that could be employed in the Black-Scholes formula was the standard deviation. The improved resource allocation system permits the user to choose among a number of different objective functions, to adjust the selected objective function for non-normal distribution of asset returns, and to select the volatility function employed in the Black-Scholes formula from a number of different volatility functions. The graphical user interface for selecting among the objective functions is shown at 1001 in FIG. 10. When the user clicks on button 413, window 1003 appears. Window 1003 contains a list of the available and currently-selectable objective functions that are available for use in basic RDE 325 and robust RDE 327. The user may select one objective function from the list. Information about the selected objective function appears in the window at 1005 and the label on button 413 indicates the currently-selected objective function. As may be seen from the list in window 1003, selection of the objective function includes selection of robust or non-robust optimization.

The Objective Functions

The objective functions supported in the preferred embodiment are the following:

Black-Scholes

The volatility and minimum return of the underlying asset and the duration of the investment horizon are used to calculate a set of option values for the assets used in optimization. These option values are used as linear objective function when optimizing inside the confidence bounds imposed by the global target portfolio return. This approach is the one described in U.S. Ser. No. 10/018,696.

Sharpe Ratio

The expected returns, volatilities and correlations are used in a classic non-linear maximization of the Sharpe ratio within the confidence bounds imposed by the global target portfolio return.

Rolling Sortino Ratio

The expected returns and minimum target returns on each assets is used in conjunction with asset volatilities and correlations to devise a non-linear objective function that measures risk-adjusted portfolio return in excess of the weighted minimum returns. This approach may be thought of as a Sortino ratio with a 'moving' Sortino target. This approached is formally called the 'Hunter Estimator' in the user interface, where the 'Hunter Estimator' represents the rolling Sortino Ratio. This approach is not to be confused with the Hunter Ratio approach described below.

Modified Black Scholes (Rolling Sortino Ratio)

The volatility in the classic Black-Scholes equation is replaced by a modified Black-Scholes volatility given by the rolling Sortino ratio or the 'Hunter Estimator' (ratio of the difference between expected return and minimum return to the asset volatility). This gives a set of modified Black-Scholes option values that are used as weights in a linear objective function.

Hunter Ratio

The Hunter Ratio for each asset in the optimization is computed (as the ratio of the mean of rolling Sharpe ratios to their standard deviation) and used as weights in a linear objective function that operates in the bounds of the confidence constraint imposed by the global target portfolio return.

Modified Black Scholes (Hunter Ratio)

The volatility in the classic Black-Scholes equation is replaced by a modified Black Scholes volatility given by the Hunter Ratio of the asset/manager. This gives a set of modified Black-Scholes option values that are used as weights in a linear objective function.

Adjustments to the Objective Functions

The improved asset allocation system permits a number of adjustments to the objective function to deal with special situations that affect the distribution of the asset returns. Among these non-normal distributions are the effect of the degree of liquidity of the asset, the reliability of the returns data, and the tax sensitivity of the assets.

Adjustments for Non-normality of Returns

Non-normality of returns in the preferred embodiment may be described by kurtosis and skewness or by omega. When the non-normality described by these measures is positive for the asset, the user manually assigns a premium to the asset's real option value; when the non-normality is negative, the user manually assigns a discount to the asset's real option value. Determination of skewness, kurtosis, and omega for an asset is done using the Profiler module.

Skewness and Kurtosis

Skewness is the degree of asymmetry of a distribution. In other words, it is an index of whether data points pile up on one end of the distribution. Several types of skewness are defined mathematically. The Fisher skewness (the most common type of skewness, usually referred to simply as "the" skewness) is defined by $$\gamma_1 = \frac{\mu_3}{\mu_2^{3/2}},$$

where $\mu_i$ is the ith central moment.

Kurtosis measures the heaviness of the tails of the data distribution. In other words, it is the degree of 'peakedness' of a distribution. Mathematically, Kurtosis is a normalized form of the fourth central moment of a distribution (denoted $\gamma_2$) given by $$\gamma_2 \equiv \frac{\mu_4}{\mu_2^2} - 3,$$

where $\mu_i$ is the ith central moment. Risk-averse investors prefer returns distributions with non-negative skewness and low kurtosis.

Omega

Another measure which may be used in RDE 323 to describe non-normal distributions is omega ($\Omega$). Omega is a statistic defined in Con Keating & William F Shadwick, 'A Universal Performance Measure' (2002), The Finance Development Centre, working paper. This is a very intuitive measure that allows the investor to specify the threshold between good and bad returns and based on this threshold, identify a statistic omega as the ratio of the expected value of returns in the "good" region over expected value of returns in the "bad" region. Assuming, any negative returns are unacceptable, omega is defined as $$\Omega = \frac{\text{Expected returns given returns are positive}}{\text{Expected returns given returns are negative}}$$

Now, we can sweep the loss threshold from $-\infty$ to $\infty$ and plot the statistic $\Omega$ versus the loss threshold. Comparing the $\Omega$ plot of two portfolios for realistic loss thresholds helps us determine the superior portfolio—the one with a higher $\Omega$ for realistic loss thresholds as defined by the investor's risk preferences.

RDE 323 scales $\Omega$ values for an asset against an average $\Omega$ statistic using a novel scaling mechanism depending upon the average $\Omega$ statistic and investor risk preferences and then incorporates the scaled value into the objective function as an option premium or discount. Omega values are calculated for each asset using the method described above and based on investor's risk preferences. Then the geometric mean of omegas of all assets is calculated and all asset omega scaled by this mean. Any value over one gives the option premium (scaled value −1) to be added to the asset real option value and any value less than one gives the option discount (1-scaled value) to be subtracted from the real option value of the asset.

Adjustments for the Nature of an Asset'Liquidity

In the resource allocation system described in U.S. Ser. No. 10/018,696, the objective function did not take into account properties of the liquidity of an asset. RDE 323 has two sets of measures of liquidity: a standard measure and measures for crisis times.

The Standard Liquidity Measure

For publicly traded assets (e.g. stocks), liquidity can be quantified in terms of average and lowest volume as a fraction of outstanding securities, average and lowest market value traded as a fraction of total market value, market depth for the security, derivatives available, open interest and volume of corresponding derivative securities. RDE 323 uses a novel regression model to come up with a measure of liquidity for an asset based on relevant factors discussed above. The model is a linear multi-factor linear regression model wherein the coefficients of linear regression are derived using a software component from Entisoft (Entisoft Tools)

Crisis Liquidity Measures

The standard liquidity measure can be ineffective in times of crisis when there may be an overall liquidity crunch in the broad market. RDE 323 defines two novel measures of liquidity that specifically address this concern of plummeting liquidity in times of crises:

Elasticity of Liquidity™ is the responsiveness of the measure of liquidity of an asset to an external factor such as price or a broad market index. For example, an asset with elastic liquidity characteristics would preserve liquidity in times of crisis. On the other hand, an asset with inelastic liquidity would become illiquid and therefore worthless during a liquidity crunch.

Velocity of Liquidity™ is the speed with which liquidity is affected as a function of time during a liquidity crisis. A measure of the velocity is the worst peak to trough fall in volume traded over the time taken for this decline in liquidity.

RDE 323 incorporates both Elasticity of Liquidity™ and Velocity of Liquidity™ into the objective function by means of option premiums or discounts that have been scaled for an average measure of liquidity and velocity for the assets considered in the portfolio.

Liquidity of Assets such as Hedge Funds

With assets such as hedge funds, it is difficult to quantify liquidity as described above, since most of the securities data is abstracted from the investor and composite trading volume numbers reported at best. In such cases, RDE 323 determines the average liquidity of the hedge fund portfolio from the percentage of liquid and marketable assets in the hedge fund portfolio, percentage positions as a fraction of average and lowest trading volume, days to liquidate 75%/90%/100% of the portfolio, and any other liquidity information which is obtainable from the hedge fund manager. The average liquidity of the portfolio is then used to determine an option premium or discount based and the option premium or discount is used as an additive adjustment to the real option value.

Adjustments for the Length of Time an Asset has been Available

RDE 323 applies reliability premiums and discounts to the objective function to adjust for the length of time an asset has been available. The premium or discount is based on the "years since inception" of the asset and is a sigmoidal plot starting out flat till 2-3 years, then increasing steadily through 7-8 years and then flattening out slowly as "years since inception" increase even further. Another way of dealing with assets for which long-term information is not available is to make scenarios for the portfolio that contains them and apply robust RDE 327 to the portfolio as described above.

Adjustments for the Tax Sensitivity of an Asset

The ultimate returns from an asset which are received by the investor are of course determined by the manner in which the returns are taxed. Returns from tax-exempt assets, from tax-deferred assets, and returns in the forms of dividends, long-term gains, and short-term gains are taxed differently in many taxation systems. In RDE 323, the expected returns and covariance of the assets are calculated post-tax assuming tax efficiency for the asset and tax criteria of the account considered. During optimization, the post-tax inputs are used in the objective function and in the constraints.

Tax sensitivity of an asset can be gauged by the following three parameters that are reported by funds/managers:

Turnover, $$T = \frac{\text{Realized Returns}}{\text{Total Reported(Realized + Unrealized)}}$$

Long-Term/Short-Term Cap-Gains, $$R_{LS} = \frac{\text{Long-Term Capital Gains}}{\text{Short-Term Capital Gains}}$$

Dividends, D=Dividend Yield

Let the tax rates on long-term cap-gains, short-term cap gains and dividends be $i_L$, $i_S$ and $i_D$ respectively. These rates can be customized for each client and account as described below. The tax-modified returns for the manager are then given by $$r_{tax\text{-}modified} = [(1-T)+(T-D)[R_{LS}(1-i_L)+(1-R_{LS})(1-i_S)] + D(1-i_D)]r_{reported}$$

For example, if the turnover for some manager is 30% and the ratio of long-term to short-term cap gains is 40% with a dividend of 2%, then with taxes rates 18% for long-term cap gains and dividends and 38% for short-term cap gains, the tax-modified returns would be 91% of the reported returns.

The relative tax-efficiency of the manager can be assessed by the tax-efficiency factor that is given by $$\text{Tax Efficiency} = \frac{1 - [(1-T)+(T-D)[R_{LS}(1-i_L)+(1-R_{LS})(1-i_S)] + D(1-i_D)]}{T}$$

For the hypothetical manager considered above, Tax Efficiency would be 0.3. As can be seen from the expression above, the tax efficiency of an asset increases with increases in the fraction of long-term capital gains in the realized returns. Less turnover also increases the asset's tax efficiency. This can be explained by the fact that as turnover decreases, the percentage of the gains that are realized as long-term gains increases.

A simpler measure of tax sensitivity has been devised for investment management applications. In this measure, reported returns are assumed to be made up of realized capital gains (long-term and short-term), income (dividends), and unrealized capital gains. Post-tax returns are found by deducting the respective taxes on long and short-term capital gains and dividends from the reported returns. The asset module is used to associate the information needed to determine tax efficiency with the asset.

Customizable Client Tax Rates

The tax rates for each client/account can be customized according to whether the account is tax-exempt, tax-deferred or otherwise. State tax and alternative minimum tax rates can be imposed via specifying the long-term, short-term and dividend tax rates. These tax rates are them used to calculate the post-tax returns and covariance for the assets in the portfolio.

Options for Quantifying an Asset's Risk

RDE 323 offers the user three modes of quantifying the risk of an asset. RDE 323 then uses the risk as quantified according to the selected mode to calculate the real option values. The modes are:

1. Flat Risk: The flat risk assumes a uniform risk (say −10%) on each asset in the portfolio.
2. Mean—2* Standard Deviation: Another commonly used measure of the risk of investing in an asset is the mean minus twice the standard deviation of the returns distribution on an asset. Statistically, there is a 5% probability of the returns falling below this measure (assuming a normal distribution of returns for the asset)
3. Worst 1-year rolling return: This is a conservative estimate of the risk associated with investing in an asset. It measures risk as the worst 1-year rolling return on the asset since its inception.

Figure 11:
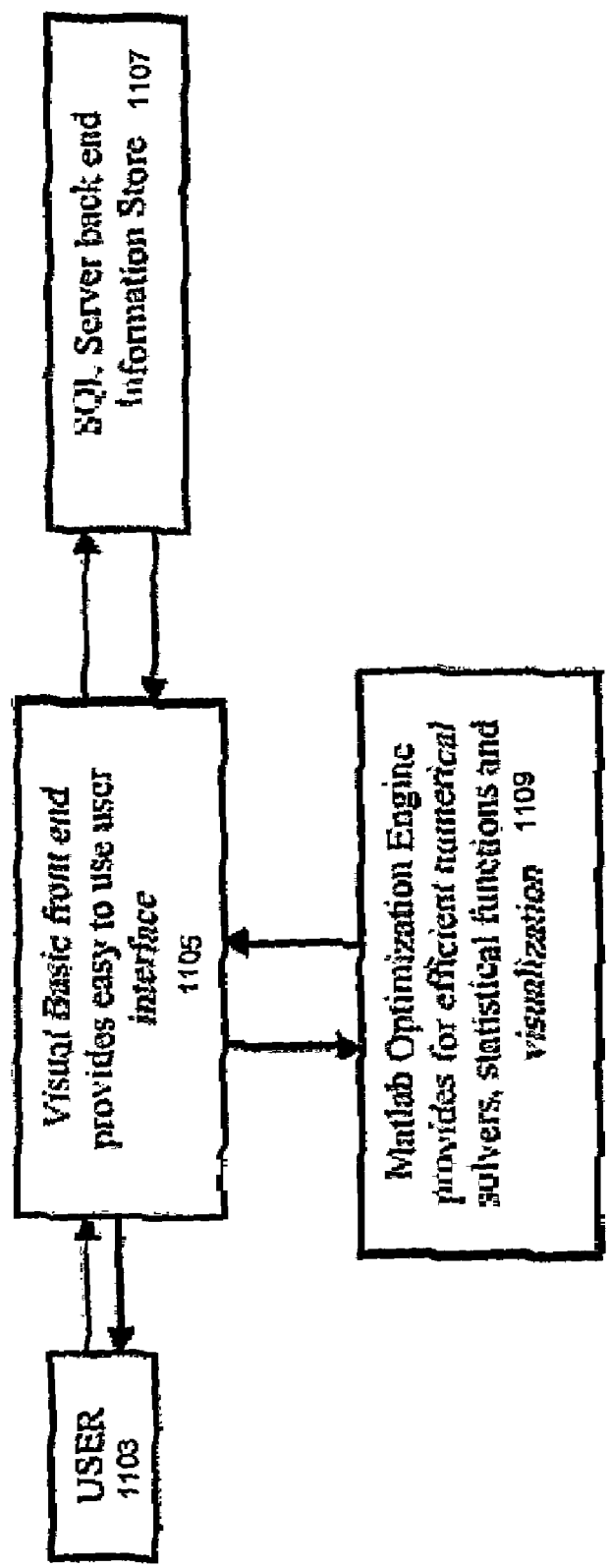
FIG. 11 is a block diagram of an implementation of the improved resource allocation system.
Figure 12:
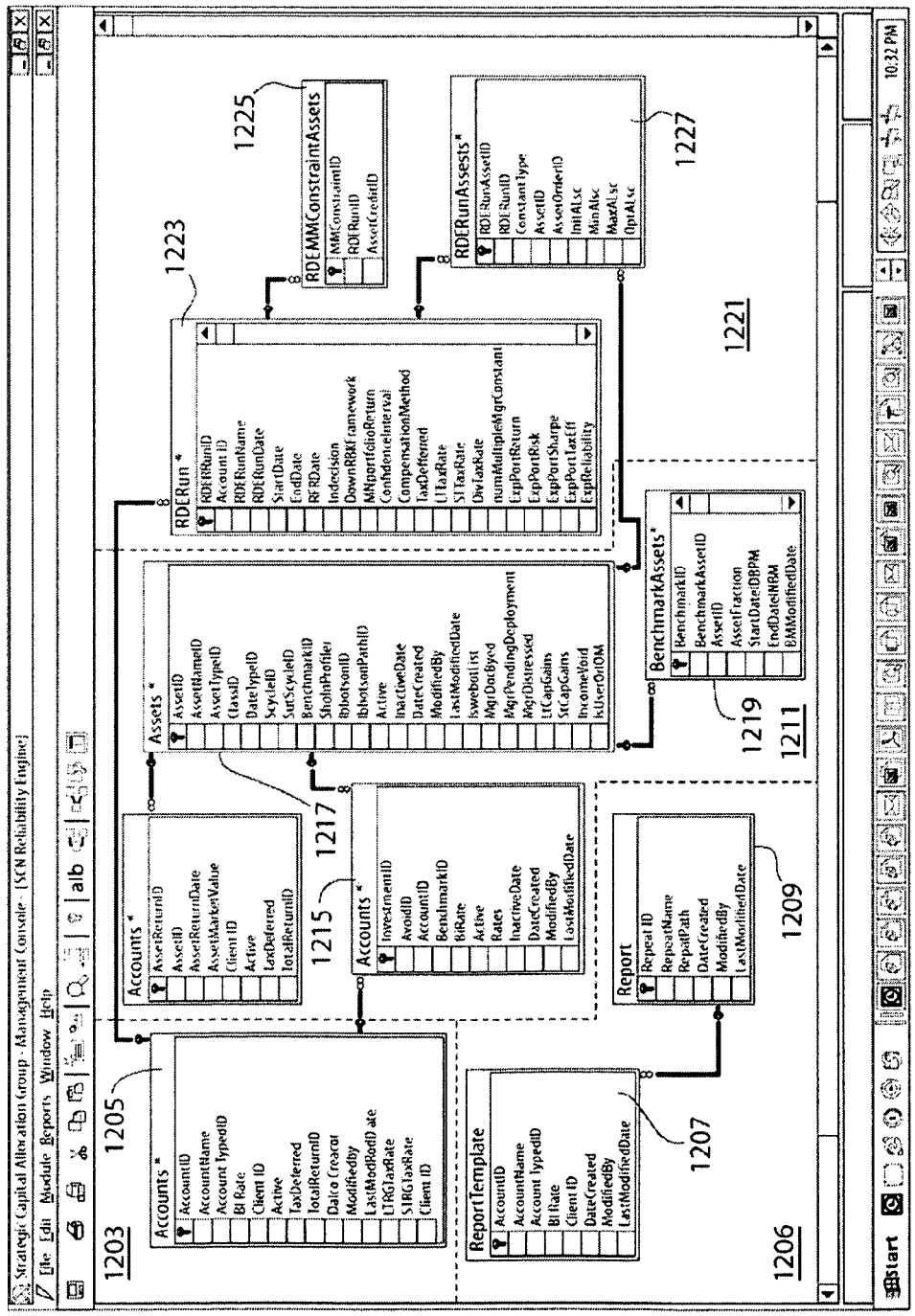
FIG. 12 is the schema of the database used in the implementation.

Implementation Details of a Preferred Embodiment: FIGS. 11-12

The improved asset allocation system is implemented with a GUI created using Microsoft Visual Basic. Microsoft COM and .NET compliant components, Excel Automation for report generation, a Matlab optimization engine for numerical computations and optimization support, and a robust back-end SQL Server database for data storage. Microsoft Visual Basic, Excel Automation, and SQL Server are all manufactured by Microsoft Corporation of Richmond, Wash. The Matlab optimization engine and the programs that perform the computations are part of the Matlab program suite available from The Math Works, Inc., Natick, Mass. Microsoft, Visual Basic, Excel, and SQL Server are trademarks of Microsoft Corporation; Matlab and The Math Works are trademarks of The Math Works, Inc. FIG. 11 is a functional block diagram of improved asset allocation system 1109. User 1103 interacts with system 1101 via Visual Basic programs 1105. Data describing assets, portfolios, and parameters for optimizations, as well as the results of the optimizations is written to and read from the database in SQL Server back end 1107, while the mathematical computations are performed by optimization engine 1109, which is thus an implementation of RDE 323.

Details of the SQL Server Database: FIG. 12

FIG. 12 shows the tables in relational database 1201 in SQL Server 1107. For purposes of the present discussion, the tables fall into four groups:

account tables 1203, which contains a single table, account table 1205, which contains information about the accounts for which asset allocation optimizations are made.

Report tables 1206, which contain information needed to prepare reports.

Asset tables 1211, which contain asset-related information; and

Optimization run tables 1221, which contain information related to optimizations of portfolios of assets by RDE 323.

The tables that are of primary importance in the present context are asset tables 1211 and optimization run tables 1221.

Each optimization run of RDE 323 is made for an account on a set of assets. The run uses a particular objective function and applies one or more constraints to the: optimization. Tables 1203, 1211, and 1221 relate the account, the set of assets, and the constraints to the run. Beginning with accounts table 1205, there is one entry in accounts table 1205 for each account; of the information included in the entry for an account, the identifier for the entry and the tax status information for the account is of the most interest in the present context. The entry specifies whether the account is tax deferred, the account's long term capital gains tax rate, and its short term capital gains tax rate.

Asset Tables 1211

Tables 1211 describe the assets. The main table here is assets table 1217, which has an entry for each kind of asset or benchmark used in RDE 323. Information in the entry which is of interest in the present context includes the identifier for the asset, information that affects the reliability of information about the asset, and information concerning the percentage of the yields of the asset come from long-term and short-term gains and the dividend income. RDE 323 keeps different information for an entry in asset table 1217 depending on whether it represents an asset or a benchmark. When the entry is an asset, the extra information is contained in investment table 1215. There is an entry in investment table 1215 for each combination of asset and account. When the entry is a benchmark, the extra information is contained in BenchMarkAsset table 1211, which relates the asset to the benchmark. AssetReturns table 1213, finally, relates the asset to the current return information for the asset. This information is loaded from current market reports into asset returns table 1213 prior to each optimization by RDE 323.

Optimization Run Tables 1221

The chief table here is RDERun table 1223. There is an entry in RDERun table 1223 for each optimization run that has been made by RDE 323 and not deleted from the system. The information in an RDERun table entry falls into two classes: identification information for the run and parameters for the run. The identification information includes an identifier, name, and date for the run, as well as the identifier for the record in account table 1205 for the client for which the run was made.

Parameters include the following:
Parameters for defining the optimization, including the start date and end date for the historical data about the assets, the anticipated rate for risk-free investments, and the investment horizon.
The mode by which the risk is to be quantified;
The minimum return desired for the portfolio
The range of returns for which a confidence value is desired;
The optimization method (i.e., the objective function to be employed in the optimization);
Tax rate information for the run;
the number of multiple asset constraints for the run;
Constraints based on the return, risk, Sharpe Ratio, tax efficiency, and reliability for the optimized portfolio.

One or more RDEMMConstraintAssets entries in RDEMMConstraintAssets table 1225 may be associated with each RDERun entry. Each RDEMMConstraintAssets entry relates the RDERun entry to one of a set of constraints that apply to multiple assets. RDERunAssets table 1227, finally, contains an entry for each asset-run combination. For a particular run and a particular asset that belongs to the portfolio optimized by the run, the entry indicates the initial weight of the asset in the portfolio being optimized in the run, any constraints for the minimum and maximum weights permitted for the asset in the portfolio being optimized, and the weight of the asset in the portfolio as optimized by the run.

When database schema 1201 is studied in conjunction with the descriptions of the graphical user interfaces for inputting information into RDE 323, the descriptions of the optimization operations, and the descriptions of the effects of the constraints on the optimization operations, it will be immediately apparent to those skilled in the relevant technologies how system 1101 operates and how a user of system 1101 may easily define different portfolios of assets, may select assets for a portfolio according to the MMF reliability of the set of assets, and may optimize the portfolio to obtain a weighting of the assets in the portfolio that is made according to the real option values of the assets as constrained by a total return reliability constraint. The optimization may be done using either standard optimization techniques or robust optimization techniques. A user of system 1101 may with equal ease make various adjustments to the objective function used to compute the real option values of the portfolio's assets and may also subject the optimization to many constraints in addition to the total return reliability constraint.

CONCLUSION

The foregoing Detailed Description has disclosed to those skilled in the relevant technologies how to make and use the improved resource allocation system in which the inventions disclosed herein are embodied and has also disclosed the best mode presently known to the inventors of making the improved resource allocation system. It will be immediately apparent to those skilled in the relevant technologies that the principles of the inventions disclosed herein may be used in ways other than disclosed herein and that resource allocation systems incorporating the principles of the invention may be implemented in many different ways. For example, the principles disclosed herein may be used to allocate resources other than financial assets. Further, the techniques disclosed herein may be used with objective functions, constraints on the objective functions, and adjustments to the objective functions which are different from those disclosed herein, as well as with scenarios for robust optimization which are different from the ones disclosed herein. Finally, many different actual implementations of resource allocation systems that incorporate the principles of the inventions disclosed herein may be made. All that is actually required is a store for the data and a processor that has access to the store and can execute programs that generate the user interface and do the mathematical computations. For example, an implementation of the resource allocation system could easily be made in which the computation and generation of the user interface was done by a server in the World Wide Web that had access to financial data stored in the server or elsewhere in the Web and in which the user employed a Web browser in his or her PC to interact with the server.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A method of analyzing a reliability of a set of more than one asset, the assets in the set being selected from a plurality of assets, historic returns data for the assets of the plurality being stored in storage accessible to a processor, and
the method comprising the steps which the processor has been programmed to perform of:
receiving inputs indicating assets selected for the set and for each selected asset, a desired minimum return;
using the historic returns data to determine a probability that at least one of the assets in the set will not provide the desired minimum return indicated for the asset; and
outputting the probability as an indication of the reliability of the set of assets.

2. The method set forth in claim 1 wherein
the step of using the historic returns to determine a probability comprises the steps of:
using the multivariate normal distribution for the returns of the assets to determine the probability that each of the selected assets will provide the desired minimum return; and
determining the probability that at least one of the selected assets will not provide the desired minimum return from the probability that each of the selected assets will provide the desired minimum return.

3. The method set forth in claim 2 wherein:
in the step of using the multivariate normal distribution, the probability that each of the selected assets will provide the desired return is determined using real option values of the assets.

4. The method set forth in claim 1 wherein:
the received inputs include a period of time; and
the probability is the probability over the period of time.

5. A method of optimizing a value of a set of assets over a set of a plurality of scenarios, each scenario in the set of scenarios affecting values of assets in the set of assets, historic returns data for the assets being stored in storage accessible to a processor, and the method comprising the steps which the processor has been programmed to perform of:

receiving inputs indicating the set of scenarios, each scenario specifying values which are used in optimizing the set of assets and which vary stochastically between two extremes and each scenario specifying a probability of occurrence for the scenario; and optimizing weights of the assets in the set to maximize a worst-case value of the set of assets over the set of scenarios.

6. The method of optimizing set forth in claim 5 wherein:
the worst-case value of the set of assets is the worst-case real option value thereof; and
the values which are used in optimizing are the mean return and the covariance.

7. The method of optimizing set forth in claim 5 wherein:
a scenario in the set of scenarios may correspond to the historical returns data for the assets in the set of assets.

8. The method of optimizing set forth in claim 5 wherein:
a scenario in the set of scenarios may include certain assets in the set of assets which are highly correlated.

9. The method of optimizing set forth in claim 5 wherein:
a scenario in the set of scenarios may correspond to outliers in the historical returns data.

10. The method of optimizing set forth in claim 5 further comprising the step of:
receiving inputs indicating additional constraints to which the set of assets being optimized is subject; and
in the step of optimizing weights of the assets, optimizing the weights subject to the additional constraints.

11. A method of selecting a set of assets from a plurality thereof of the sets of assets and optimizing maximizing the weights of the assets in a value of the selected set of assets, historic returns data for assets being stored in storage accessible to a processor and the method comprising the steps performed in the which the processor has been programmed to perform of:

1) selecting a the set of assets on the basis of a reliability of the set of assets, the reliability being a probability based on the historic returns data that at least one asset of the set of assets in a selected set will not provide a desired minimum return indicated specified for the asset; and 2) optimizing the weights of the assets in the selected set of assets to maximize the value of the selected set of assets.

12. The method set forth in claim 11 wherein:
the probability that at least one of the assets will not provide the desired minimum return is determined using the real option values for the assets.

13. The method set forth in claim 11 wherein:
optimizing the weights of the assets in the selected set of assets is done using the real option values for the assets.

14. The method set forth in claim 13 wherein:
the method further includes the step of:
receiving an input indicating one of a plurality of objective functions for computing the real option values for the assets; and
in the step of optimizing the weights of the assets in the selected set of assets, the optimization is done using the indicated objective function of the plurality.

15. The method set forth in claim 14 wherein:
in the step of optimizing the weights of the assets, the objective function is adjusted by assigning a premium or a discount to the real option value of one or more of the assets.

16. The method set forth in claim 15 wherein:
the objective function is adjusted to take non-normal returns for the asset into account.

17. The method set forth in claim 15 wherein:
the objective function is adjusted to take liquidity characteristics of the asset into account.

18. The method set forth in claim 15 wherein:
the objective function is adjusted to take tax sensitivity of an asset into account.

19. The method set forth in claim 15 wherein:
the objective function is adjusted to take the length of time an asset has been available into account.

20. The method set forth in claim 13 wherein:
the method further includes the step of:
receiving an input indicating one of a plurality of modes of quantifying the risk of an asset; and
in the step of optimizing the weights of the assets in the selected set of assets, the optimization is done using the indicated mode of the plurality.

21. The method set forth in claim 11 wherein:
optimizing the weights of the assets in the selected set of assets is done using robust optimization.

22. The method set forth in claim 21 wherein:
the robust optimization optimizes over a set of user-specified scenarios, each scenario having values which are used in optimizing the selected set of assets and which vary stochastically between two extremes and a probability of occurrence for the scenario.

23. The method set forth in claim 11 wherein:
optimizing the weights of the assets is done subject to a constraint that the probability that the selected set of assets yields a desired minimum return is greater than a user-specified value a.

24. The method set forth in claim 23 wherein:
the optimization is done subject to a plurality of constraints (1 . . . n), a constraint $c_i$ specifying that the probability that the selected set of assets yields a desired minimum return that is greater than a user-specified value $a_i$.

25. The method set forth in claim 23 wherein:
optimizing the weights of the assets in the selected set of assets is done using robust optimization.

26. The method set forth in claim 25 wherein:
the robust optimization optimizes over a set of user-specified scenarios, each scenario including a mean return and a covariance matrix, each of which varies stochastically between two extremes, and a probability of occurrence for the scenario.

27. The method set forth in claim 11 wherein:
the an asset in the selected set of assets may have a negative weight.

28. The method set forth in claim 11 wherein;
the sum of the weights of the assets in the selected set of assets may exceed 1.

29. The method set forth in claim 11 wherein:
optimizing the weight of the assets in the selected set of assets is done subject to one or more additional constraints.

30. The method set forth in claim 29 wherein:
the additional constraint restricts the sum of the weights of the assets belonging to a selected subset of the assets in the selected set of assets.

31. The method set forth in claim 29 wherein:
the additional constraint constrains the weight of an asset such that the amount of the asset in the selected set of assets is above a minimum investment threshold.

32. The method set forth in claim 29 wherein:

the additional constraint limits constrains the set's downside risk of the selected set of assets to be less than a predetermined value b.

33. The method set forth in claim 32 wherein;

the additional constraint is computed from the worst drawdown for each asset.

34. The method set forth in claim 32 wherein:

the additional constraint is computed from the set's average return and standard deviation for the selected set of assets.

35. The method set forth in claim 11 wherein:

the probability is the probability over a period of time.

* * * * *